United States Patent
Nakano et al.

(10) Patent No.: US 8,740,698 B2
(45) Date of Patent: Jun. 3, 2014

(54) GAME SYSTEM, GAME EXECUTION APPARATUS, AND PORTABLE STORAGE MEDIUM

(75) Inventors: Toshihisa Nakano, Osaka (JP); Yuichi Futa, Osaka (JP); Kaoru Yokota, Hyogo (JP); Motoji Ohmori, Osaka (JP)

(73) Assignee: Panasonic Corporation, Osaka (JP)

( * ) Notice: Subject to any disclaimer, the term of this patent is extended or adjusted under 35 U.S.C. 154(b) by 88 days.

(21) Appl. No.: 13/224,428

(22) Filed: Sep. 2, 2011

(65) Prior Publication Data

US 2011/0319163 A1  Dec. 29, 2011

Related U.S. Application Data

(63) Continuation of application No. 10/576,697, filed as application No. PCT/JP2004/016452 on Oct. 29, 2004, now abandoned.

(30) Foreign Application Priority Data

Oct. 29, 2003  (JP) ................................ 2003-369551

(51) Int. Cl.
*A63F 9/24* (2006.01)
*G07F 17/32* (2006.01)
*A63F 13/12* (2006.01)

(52) U.S. Cl.
CPC ............... *G07F 17/32* (2013.01); *A63F 13/12* (2013.01)
USPC ..................... 463/29; 463/42; 463/43; 703/23

(58) Field of Classification Search
USPC ................. 463/1, 29, 42, 43; 703/23
See application file for complete search history.

(56) References Cited

U.S. PATENT DOCUMENTS 5,629,980 A * 5/1997 Stefik et al. ..................... 705/54
5,903,273 A   5/1999 Mochizuki et al.
(Continued)

FOREIGN PATENT DOCUMENTS

EP  0 960 637  12/1999
EP  1 080 758  3/2001
(Continued)

OTHER PUBLICATIONS

Hardware Nintendo Gamecube, http://www.nintendo.co.jp/ngc/acce/gbplayer, retrieved Feb. 10, 2006.
(Continued)

*Primary Examiner* — Tsan-Yu J Huang
(74) *Attorney, Agent, or Firm* — Wenderoth, Lind & Ponack L.L.P.

(57) ABSTRACT

A game system in which game software produced to be used in stationary game machines can be used in portable game machines. The game system includes a stationary game machine, a portable game machine, and a memory card connectable to both the stationary and portable game machines. Image data contained in game software produced for the stationary game machine shows an image in the form of free-form surface. The stationary game machine converts the image data to show the image in the form of a polygon according to processing performance of the portable game machine, and stores the converted image data and a game program executable by the portable game machine onto the memory card. The portable game machine executes the game program stored on the memory card, and generates and displays a display image from the image data stored on the memory card.

13 Claims, 21 Drawing Sheets

(56) References Cited

U.S. PATENT DOCUMENTS

| | | | |
|---|---|---|---|
| 6,132,315 A | 10/2000 | Miyamoto et al. | |
| 6,220,964 B1 | 4/2001 | Miyamoto et al. | |
| 6,334,815 B2 | 1/2002 | Miyamoto et al. | |
| 6,496,979 B1* | 12/2002 | Chen et al. | 717/178 |
| 6,563,498 B1 | 5/2003 | Hirata et al. | |
| 6,581,160 B1* | 6/2003 | Harada et al. | 713/169 |
| 6,778,711 B2 | 8/2004 | Morita | |
| 6,884,171 B2* | 4/2005 | Eck et al. | 463/42 |
| 2001/0021670 A1 | 9/2001 | Miyamoto et al. | |
| 2001/0026647 A1 | 10/2001 | Morita | |
| 2002/0111216 A1 | 8/2002 | Himoto et al. | |
| 2003/0190952 A1 | 10/2003 | Smith et al. | |
| 2004/0157664 A1* | 8/2004 | Link | 463/43 |

FOREIGN PATENT DOCUMENTS

| | | |
|---|---|---|
| EP | 1 127 596 | 8/2001 |
| JP | 9-171567 | 6/1997 |
| JP | 11-207034 | 8/1999 |
| JP | 2001-109908 | 4/2001 |
| JP | 2001-312258 | 11/2001 |
| JP | 2001-331812 | 11/2001 |
| JP | 2002-74020 | 3/2002 |
| JP | 3313221 | 8/2002 |

OTHER PUBLICATIONS

*Consideration on Organic Shape Generation and Attribute Design*, Information Processing Society of Japan Research Report, 91-CG-52 (1991) (with partial English translation).

* cited by examiner

FIG.9

| CONVERSION TABLE | | | | | |
|---|---|---|---|---|---|
| PIXEL SIZE | ROUGHNESS 1 | | ROUGHNESS 2 | | ... |
| | RL | Nmax | RL | Nmax | |
| ... | ... | ... | ... | ... | ... |

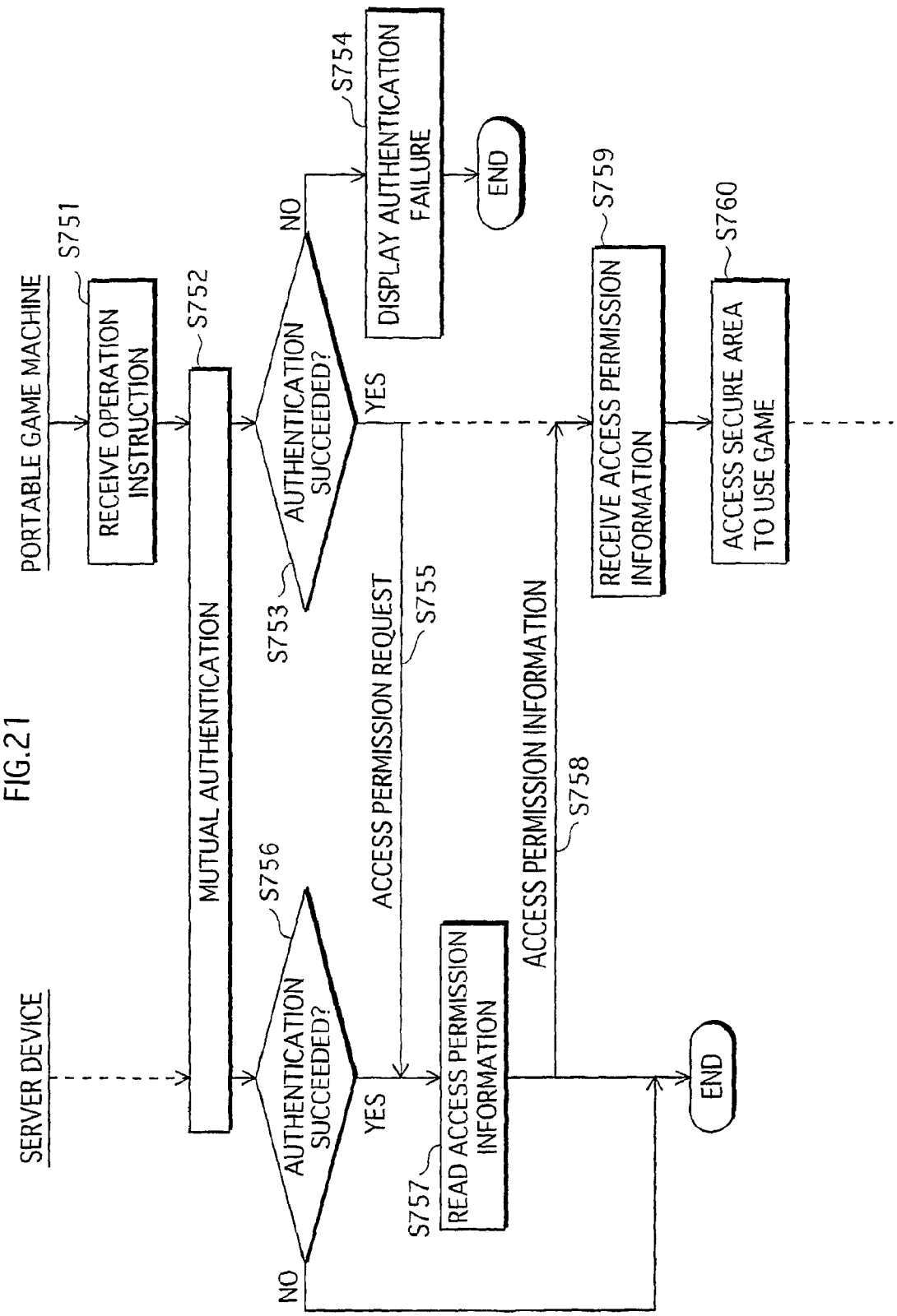

GAME SYSTEM, GAME EXECUTION APPARATUS, AND PORTABLE STORAGE MEDIUM

This is a continuation of U.S. application Ser. No. 10/576,697, filed Apr. 21, 2006 now abandoned, which is the National Stage of International Application No. PCT/JP2004/016452, filed Oct. 29, 2004.

TECHNICAL FIELD

The present invention relates to techniques of processing a computer game that is executed in accordance with a computer program describing a procedure of the game.

BACKGROUND ART

With the progress of computer technology in recent years, both stationary game machines that have high processing power and portable game machines that are small enough to carry are developed and introduced on the market.

Usually, a stationary game machine and a portable game machine use different types of storage media. For instance, the stationary game machine uses game software stored on an optical disc or the like, whereas the portable game machine uses game software stored on a dedicated cartridge or the like. This being so, the optical disc storing the game software for the stationary game machine cannot be inserted into the portable game machine, and the dedicated cartridge storing the game software for the portable game machine cannot be inserted into the stationary game machine.

Besides, the stationary game machine and the portable game machine differ in various aspects such as the system architecture, the number of processors and their type, and the display capacity. Hence the game software for the stationary game machine is not designed so as to be readily executable by the portable game machine, and the game software for the portable game machine is not designed so as to be readily executable by the stationary game machine.

In view of this, the document http://www.nintendo.co.jp/ngc/acce/gbplayer proposes the use of a dedicated adapter, to load a dedicated cartridge storing game software for a portable game machine into a stationary game machine so that the game software can be executed by the stationary game machine. This enables the user to enjoy playing a game produced for use in a portable game machine, using a stationary game machine.

According to this technique, a game produced for use in a portable game machine can be played on a stationary game machine. There is still a need, however, to enable a game produced for use in a stationary game machine to be played on a portable game machine.

Note that the following documents are referenced as conventional techniques in this specification: the aforementioned http://www.nintendo.co.jp/ngc/acce/gbplayer; David F. Rogers Procedural Elements for Computer Graphics, Nikkan Kogyo Shimbun., Ltd. (translation) (Nov. 15, 1996); Yukinori Yamasaki Book for Becoming a Game Programmer, IBM PC/AT Compatible Machines, CQ Publishing Co., Ltd. (Feb. 1, 1998); Japanese Patent Application Publication No. H09-171567; and Japanese Patent Application Publication No. 2001-331812.

DISCLOSURE OF THE INVENTION

To meet the above need, the present invention aims to provide a game system, a portable storage medium, and game execution apparatuses that enable a game designed for use in a stationary game machine to be executed by a portable game machine.

The stated aim can be achieved by a game system including a first game execution apparatus and a second game execution apparatus which each execute a game in accordance with a game program, and a portable storage medium, wherein the first game execution apparatus converts first image data to second image data and outputs the second image data, the first image data being suited for use in the first game execution apparatus, and the second image data being suited for use in the second game execution apparatus, the portable storage medium acquires the second image data from the first game execution apparatus and stores the second image data, and outputs the second image data according to a request by the second game execution apparatus, and the second game execution apparatus acquires a game program suited for use in the second game execution apparatus, requests and acquires the second image data from the portable storage medium, executes a game in accordance with the acquired game program, and generates an image from the acquired second image data and displays the generated image in accordance with progression of the game.

The stated aim can also be achieved by a first game execution apparatus for executing a game in accordance with a game program, including: a conversion unit operable to convert first image data suited for use in the first game execution apparatus, to second image data suited for use in a second game execution apparatus; and an output unit operable to output the second image data to a portable storage medium.

The stated aim can also be achieved by a portable storage medium that is removably connectable to a first game execution apparatus and a second game execution apparatus which each execute a game in accordance with a game program, including: an acquisition unit operable to acquire second image data generated by converting first image data from the first game execution apparatus, the first image data being suited for use in the first game execution apparatus, and the second image data being suited for use in the second game execution apparatus; a storage unit operable to store the acquired second image data; and an output unit operable to output the second image data stored in the storage unit to the second game execution apparatus, according to a request by the second game execution apparatus.

The stated aim can also be achieved by a second game execution apparatus for executing a game in accordance with a game program, including: a read unit operable to read, from a portable storage medium, second image data generated by converting first image data, the second image data being suited for use in the second game execution apparatus, and the first image data being suited for use in a first game execution apparatus; an acquisition unit operable to acquire a game program suited for use in the second game execution program; and a game execution unit operable to execute a game in accordance with the acquired game program, and generate an image from the acquired second image data and display the generated image in accordance with progression of the game.

According to this construction, the first game execution apparatus converts the first image data to the second image data suitable for use in the second game execution apparatus. Through the use of this second image data, the second game execution apparatus can execute the game designed for use in the first game execution apparatus.

Here, the first game execution apparatus may further include: an acquisition unit operable to acquire display information showing a display capacity of a display device equipped in the second game execution apparatus, from the portable storage medium, wherein the conversion unit converts the first image data to the second image data based on the display information.

Here, the second game execution apparatus may further include: an output unit operable to output display information showing a display capacity of the second game execution apparatus, according to a request by the portable storage medium.

According to this construction, the first image data is converted to the second image data based on the display capacity of the second game execution apparatus. This allows the second game execution apparatus to execute the game using image data of a highest quality possible within the range of its display capacity.

Here, the display information may show a number of pixels of a monitor included in the display device.

According to this construction, the first image data is converted to the second image data based on the number of pixels of the second game execution apparatus. This allows the second game execution apparatus to display an image of a highest definition possible within the range of its display capacity.

Here, the display information may show a clock rate of a control unit included in the display device.

According to this construction, the first image data is converted to the second image data based on the processing power of the control unit in the second game execution apparatus. This allows the second game execution apparatus to display an image of a highest definition possible within the range of its processing power.

Here, the display information may show a data transfer rate of a bus included in the display device.

According to this construction, the first image data is converted to the second image data based on the data transfer rate of the bus in the second game execution apparatus. This allows the second game execution apparatus to display an image of a highest definition possible within the range of its processing power.

Here, the first game execution apparatus may further include: an acquisition unit operable to acquire available memory information showing an available memory size of the portable storage medium, from the portable storage medium, wherein the conversion unit converts the first image data to the second image data that is within the available memory size shown by the available memory information.

Here, the first image data may represent an object by a free-form surface while the second image data represents the object by a polygon, wherein the conversion unit generates the polygon from the free-form surface.

According to this construction, the first image data showing an image in the form of a free-form surface is converted to the second image data showing the image in the form of a polygon, to reduce the data size. Accordingly, even when high-definition image data showing an image in the form of a free-form surface is stored on a game storage medium having a large storage capacity, that image data can be converted to polygon data of a reduced data size so as to be suited for use in the second game execution apparatus.

Here, the conversion unit may generate the polygon from the free-form surface, by setting polygon vertices at a predetermined interval in a part of the free-form surface that has curvedness no smaller than a predetermined value, and setting polygon vertices at an interval greater than the predetermined interval in a part of the free-form surface that has curvedness smaller than the predetermined value.

Here, the first game execution apparatus may further include: an acquisition unit operable to acquire at least one of display information and available memory information from the portable storage medium, the display information showing a display capacity of a display device equipped in the other game execution apparatus, and the available memory information showing an available memory size of the portable storage medium, wherein the conversion unit includes: a setting unit operable to set a lower-limit curvature and an upper-limit polygon side length based on the acquired display information or available memory information; a control unit operable to, for each curve that represents the free-form surface, determine a start point of the curve as a polygon vertex, move a target point along the curve from the start point to an end point of the curve by a predetermined distance, and have a calculation unit, a judgment unit, and a determination unit perform respective operations each time the target point is moved by the predetermined distance; the calculation unit operable to calculate a cumulative curvature at the target point from an immediately preceding polygon vertex, by adding a curvature at the target point to a cumulative curvature calculated immediately before the target point is moved by the predetermined distance; the judgment unit operable to judge whether the cumulative curvature at the target point is no smaller than the lower-limit curvature and whether a distance from the immediately preceding polygon vertex to the target point is no smaller than the upper-limit polygon side length; the determination unit operable to determine the target point as a polygon vertex, if the cumulative curvature at the target point is no smaller than the lower-limit curvature or if the cumulative curvature is smaller than the lower-limit curvature but the distance is no smaller than the upper-limit polygon side length; and a polygon generation unit operable to generate the polygon based on coordinates of determined polygon vertices, after the target point has been moved from the start point to the endpoint of each curve representing the free-form surface.

According to this construction, the polygon is generated according to the curvature of each curve. Here, part of each curve that has greater curvedness is converted to a finer polygon, whereas part of each curve that has smaller curvedness is converted to a rougher polygon. In this way, the image can be smoothly represented in the form of a polygon while reducing the data size.

Here, the setting unit may select the lower-limit curvature and the upper-limit polygon side length which correspond to the display capacity shown by the display information, from a conversion table that shows a correspondence between display capacities and lower-limit curvatures and upper-limit polygon side lengths.

According to this construction, the lower-limit curvature and the upper-limit polygon side length corresponding to the display capacity are set in the conversion table in advance. This makes it unnecessary for the first game execution apparatus to calculate these threshold values, which contributes to simple processing and circuit construction.

Here, if the second image data generated by the conversion unit exceeds the available memory size shown by the available memory information, the setting unit may increase the lower-limit curvature and the upper-limit polygon side length.

According to this construction, if the second image data exceeds the available memory size of the portable storage medium, the lower-limit curvature is increased and the conversion is performed again using this increased lower-limit curvature. This makes it possible to generate a finest polygon possible within the range of the available memory size. Each game differs in the aspects such as the fineness of image data and the size of image data. According to this construction however, polygon data of a highest definition possible can be generated within the range of the available memory size and the display capacity.

Here, the setting unit may read the first image data and the conversion table corresponding to the first image data, from a game storage medium.

Each game differs in the aspects such as the size of image data. According to this construction, however, each game is provided with a conversion table, so as to perform conversion that is suitable for the game.

Here, the first game execution apparatus may further include: an acquisition unit operable to acquire available memory information showing an available memory size of the portable storage medium, from the portable storage medium, wherein if the second image data exceeds the available memory size shown by the available memory information, the conversion unit regenerates a rougher polygon from the free-form surface.

According to this construction, the first image data is converted to the second image data according to the available memory size of the portable storage medium. This makes it possible to generate finest image data possible within the range of the available memory size.

Here, the first game execution apparatus may further include: an acquisition unit operable to acquire display information or available memory information from the portable storage medium, the display information showing a display capacity of a display device equipped in the second game execution apparatus, and the available memory information showing an available memory size of the portable storage medium, wherein the conversion unit selects, from a conversion table that shows a correspondence between input values for determining polygon roughness and display capacities or available memory sizes, an input value corresponding to the display capacity shown by the acquired display information or the available memory size shown by the acquired available memory information, and generates the polygon using the selected input value.

According to this construction, the first game execution apparatus does not need to calculate the input value, which contributes to simple processing and circuit construction.

Here, the conversion unit may read the first image data and the conversion table corresponding to the first image data, from a game storage medium.

According to this construction, each game is provided with a conversion table, with it being possible to perform conversion that is suitable for the game.

Here, the first game execution apparatus may further include: a holding unit operable to hold a first game program suited for use in the first game execution apparatus, and a second game program for executing a same game as the first game program and suited for use in the second game execution apparatus, wherein the output unit outputs the second game program to the portable storage medium.

According to this construction, the second game execution apparatus acquires the game program suited for use in the second game execution apparatus, from the first game execution apparatus. This enables the second game execution apparatus to acquire the game program and the second image data and execute the game, even if the second game execution apparatus does not have a communication function.

Here, the portable storage medium may further acquire the game program suited for use in the second game execution apparatus from the first game execution apparatus and stores the game program, and if game software that includes the game program and the second image data is permitted to be used by the second game execution apparatus, output the game software according to the request by the second game execution apparatus.

Here, the acquisition unit in the portable storage medium may acquire game software that includes the second image data from the first game execution apparatus, and store the acquired game software to the storage unit, wherein the portable storage medium further includes: a holding unit operable to hold management information for managing use of the game software; and a judgment unit operable to judge whether the game software is permitted to be used according to the management information, when the second game execution apparatus requests the game software, and the output unit outputs the game software to the second game execution apparatus, if the judgment unit judges that the game software is permitted to be used.

According to this construction, the management 15, information is used to judge whether the game software copied to the portable storage medium is permitted to be used. This prevents unrestricted use of the game software.

Here, the acquisition unit may acquire the management information corresponding to the game software, from the first game execution apparatus, wherein the holding unit holds the acquired management information.

According to this construction, the producer of the game software can set the management information for the game software flexibly.

Here, the holding unit may hold, as the management information, valid period information showing a valid period during which the game software is permitted to be used, wherein the judgment unit judges whether the valid period shown by the valid period information has not passed, and the output unit outputs the game software to the second game execution apparatus, if the judgment unit judges that the valid period has not passed.

According to this construction, the valid period information is used to limit the period during which the game software is permitted to be used.

Here, the acquisition unit may acquire additional valid period information showing an additional valid period during which the game software is permitted to be used, wherein the holding unit updates the valid period information, by adding the additional valid period shown by the additional valid period information to the valid period shown by the valid period information.

According to this construction, the period during which the game software is permitted to be used can be extended.

Here, the holding unit may hold the management information in an area that is inaccessible from outside the portable storage medium.

According to this construction, the management information is held in an area inaccessible from outside the portable storage medium, with it being possible to prevent unauthorized tampering of the management information.

Here, the portable storage medium may acquire the game software from the first game execution apparatus if the game software is permitted to be copied to the portable storage medium.

Here, the holding unit may further hold copy information showing whether the game software is permitted to be copied to the portable storage medium, wherein the judgment unit further judges whether the game software is permitted to be copied to the portable storage medium, based on the copy information, and the acquisition unit acquires the game software from the first game execution apparatus, if the judgment unit judges that the game software is permitted to be copied to the portable storage medium.

According to this construction, the game software is copied to the portable storage medium, only if the game software is permitted to be copied to the portable storage medium. As a result, unrestricted copying of the game software can be prevented.

Here, the copy information may show a number of times the game software is permitted to be copied to the portable storage medium, wherein the judgment unit judges whether the number shown by the copy information is no less than 1, and if the judgment unit judges that the number is no less than 1, the acquisition unit acquires the game software from the first game execution apparatus and then decrements the number by 1.

According to this construction, the number of times the game software is permitted to be copied to the portable storage medium is limited. This prevents unrestricted copying of the game software.

Here, the acquisition unit may acquire the copy information from an external management device, wherein the holding unit holds the acquired copy information.

Here, the acquisition unit may acquire additional copy information showing an additional number of times the game software is permitted to be copied to the portable storage medium, from an external management device, wherein the holding unit updates the copy information by adding the additional number shown by the additional copy information to the number shown by the copy information.

According to this construction, the number of times the game software is permitted to be copied to the portable storage medium can be set flexibly.

Here, the acquisition unit may acquire a copy program which describes a procedure of copying the game software to the portable storage medium, from an external management device.

According to this construction, the number of times the game software is permitted to be copied to the portable storage medium can be limited even if the portable storage medium is a general-purpose storage medium.

Here, the acquisition unit in the second game execution apparatus may acquire permission information for granting use of game software that includes the second image data and the game program and is stored on the portable storage medium, from an external server device through communication, wherein the game execution unit uses the game software, if the acquisition unit acquires the permission information.

According to this construction, the second game execution apparatus can use the game software, only if the second game execution apparatus is permitted to use the game software. This prevents unauthorized use of the game software.

Here, the permission information may be a decryption key for decrypting the game software which has been encrypted, wherein the second game execution apparatus further include: a decryption unit operable to decrypt the encrypted game software using the decryption key.

According to this construction, even if an unauthorized party acquires the game software, the unauthorized part cannot use the game software unless it acquires the decryption key.

BRIEF DESCRIPTION OF DRAWINGS

FIG. 9 shows a data structure of a conversion table stored in an information storage unit in the stationary game machine shown in FIG. 6.

FIG. 21 is a flowchart of a copy operation by a portable game machine having a communication function.

BEST MODE FOR CARRYING OUT THE INVENTION

The following describes an embodiment of the present invention in detail, with reference to drawings.

1. Construction of a Game System 10

Figure 1:
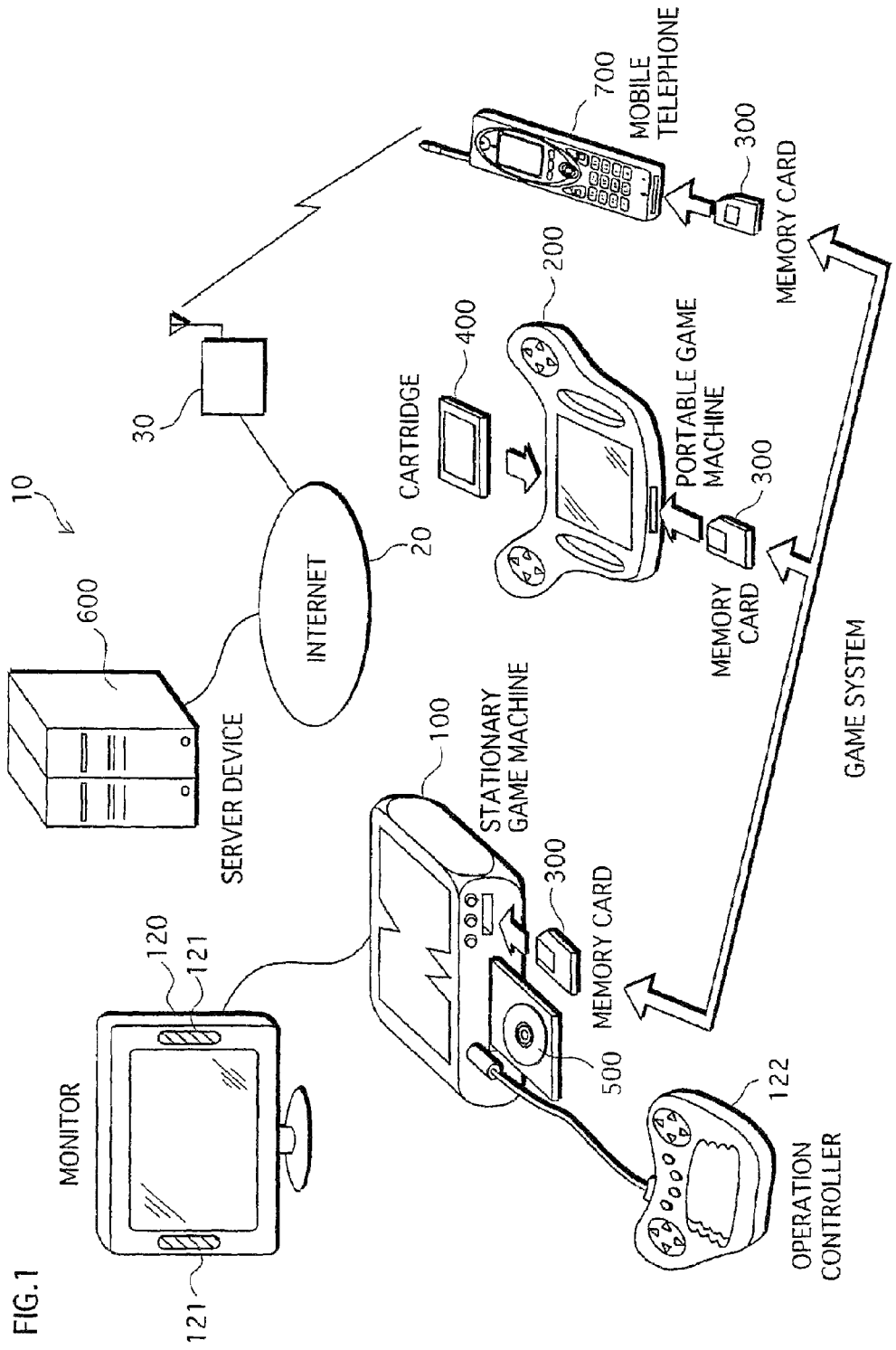
FIG. 1 shows a construction of a game system to which an embodiment of the present invention relates.

FIG. 1 shows a construction of a game system 10 to which the embodiment of the present invention relates. As shown in the drawing, the game system 10 is roughly made up of a stationary game machine 100, a portable game machine 200, a memory card 300, a cartridge 400, a DVD (Digital Versatile Disc) 500, a server device 600, a mobile telephone 700, and a base station 30.

The mobile telephone 700 can be connected to the server device 600 via the base station 30 and the Internet 20.

The memory card 300 can be inserted into the stationary game machine 100, the portable game machine 200, and the mobile telephone 700.

The user can use stationary game software (i.e. game software adapted to use in the stationary game machine 100) stored on the DVD 500 on the stationary game machine 100, by inserting the DVD 500 into the stationary game machine 100.

Also, the user can use portable game software (i.e. game software adapted to use in the portable game machine 200)

stored on the cartridge 400 on the portable game machine 200, by inserting the cartridge 400 into the portable game machine 200.

Further, the user can use the stationary game software stored on the DVD 500 on the portable game machine 200, by copying the stationary game software from the DVD 500 to the memory card 300 through the stationary game machine 100 and then inserting the memory card 300 into the portable game machine 200.

Here, the memory card 300 is a general purpose memory card. This being so, a copy application for copying the stationary game software is needed to copy the stationary game software to the memory card 300. Accordingly, the memory card 300 is connected to the mobile telephone 700, and the copy application is downloaded from the server device 600 to the memory card 300 through the use of a communication function of the mobile telephone 700.

As a result, the user can use the stationary game software on the portable game machine 200.

Each construction element of the game system 10 is described in detail below.

1.1. DVD 500

The DVD 500 is a portable optical disc capable of storing a large amount of data.

Figure 2:
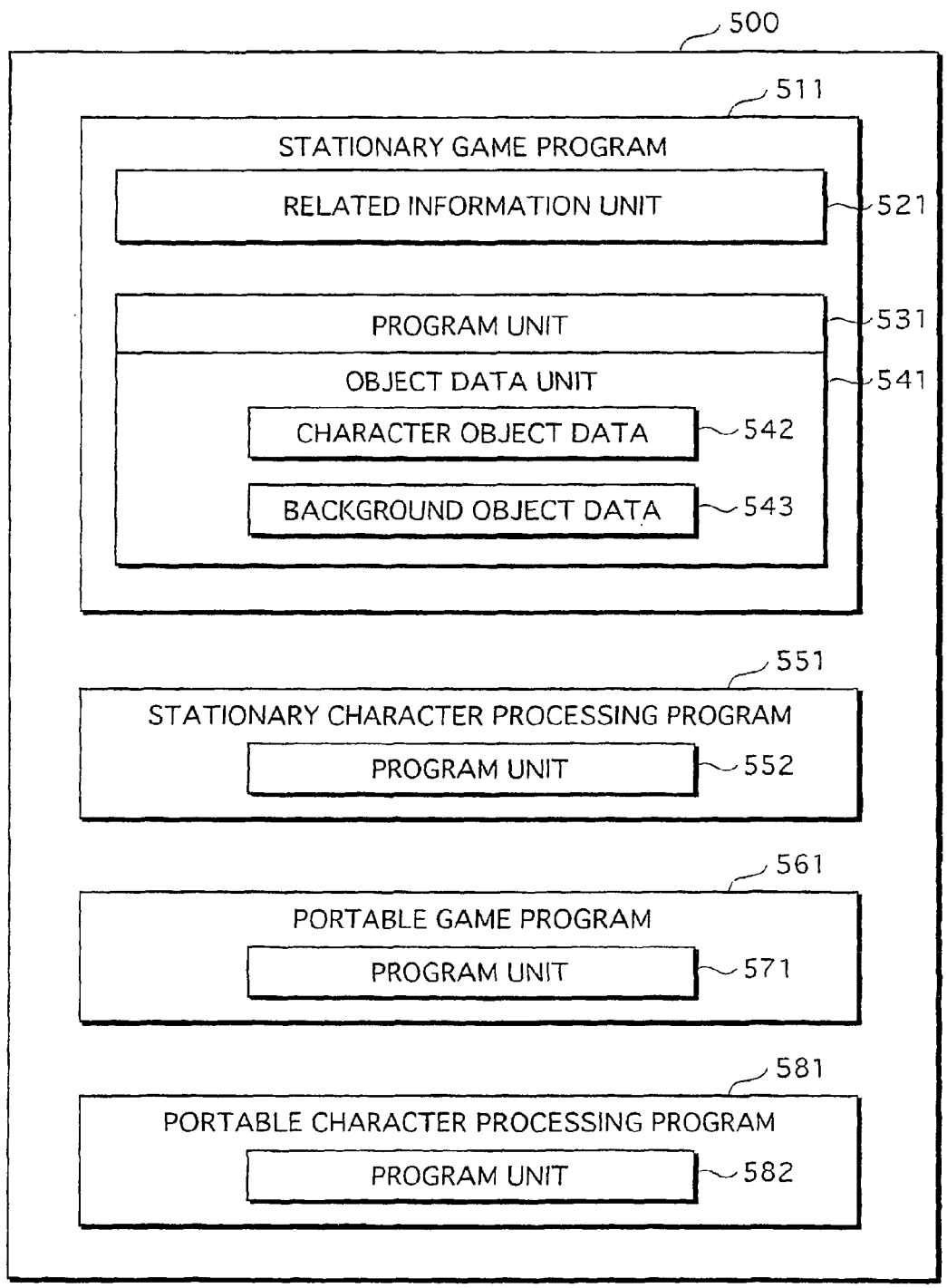
FIG. 2 shows a structure of programs and data stored on a DVD shown in FIG. 1.

FIG. 2 shows an example of programs and data stored on the DVD 500. In the drawing, a stationary game program 511, a stationary character processing program 551, a portable game program 561, and a portable character processing program 581 are stored on the DVD 500 beforehand. The stationary game program 511 and the stationary character processing program 551 are computer programs and computer data for use in the stationary game machine 100, and constitute stationary game software. The portable game program 561 and the portable character processing program 581 are computer programs and computer data for use in the portable game machine 200, and constitute part of portable game software, as explained later.

(1) Stationary Game Program 511

The stationary game program 511 is made up of a related information unit 521, a program unit 531, and an object data unit 541, as shown in FIG. 2.

(Related Information Unit 521)

The related information unit 521 contains audio information and the like (not illustrated). The audio information is obtained by encoding voices of characters, music, sound effects, and the like.

(Program Unit 531)

The program unit 531 includes a stationary main program for executing a game, and a stationary frame processing program for processing one frame of image in the game. Each of the computer programs is made up of a plurality of machine instructions written in a machine language, which are to be decoded and executed by a main control unit 108 (described later) in the stationary game machine 100. Which is to say, the stationary main program and the stationary frame processing program are used by the main control unit 108.

Here, the stationary frame processing program is called by the stationary main program.

(a) Stationary Main Program

The stationary main program is a computer program that describes a procedure of the game in a manner suitable for use in the stationary game machine 100.

(b) Stationary Frame Processing Program

The stationary frame processing program calculates coordinates (in three dimensions) of a character object and a background object in a game space, in accordance with the stationary main program and an operation instruction received from an operation controller 122 via a controller control unit 101 in the stationary game machine 100.

Here, characters and backgrounds exist virtually in the game space of three dimensions that is defined by a rectangular coordinate system of X, Y, and Z coordinates.

To form an image, part of this game space is clipped to create a display space, and a character and the like existing in the display space are projected onto a frame.

The stationary frame processing program writes the calculated coordinates of the character object to a register R1 152 in a register unit 109 in the stationary game machine 100, and the calculated coordinates of the background object to a register R2 153 in the register unit 109.

The stationary frame processing program then calls an instruction to generate the background object. In detail, the stationary frame processing program writes a background object generation instruction to a register R0 151 in the register unit 109, and outputs a control signal indicating that the instruction has been written to the register unit 109, to a graphics control unit 113. The stationary frame processing program also calls an instruction to generate the character object. In detail, the stationary frame processing program writes a character object generation instruction to the register R0 151 in the register unit 109, and outputs a control signal indicating that the instruction has been written to the register unit 109, to the graphics control unit 113.

After this, the stationary frame processing program writes a display instruction to transfer a frame image in a frame buffer 106 to a VRAM 115, to the register R0 151 in the register unit 109. The stationary frame processing program then outputs a control signal indicating that the instruction has been written to the register unit 109, to the graphics control unit 113. This completes the stationary frame processing program.

(Object Data Unit 541)

The object data unit 541 includes character object data 542, background object data 543, and other object data (not illustrated), as shown in FIG. 2.

The character object data 542 and the background object data 543 respectively show character objects and background objects in the form of free-form curve and free-form surface in the three-dimensional coordinate system. The character object data 542 and the background object data 543 are designed for use in the stationary game machine 100. Such free-form curves and free-form surfaces can be expressed, for example, by Bezier curves and Bezier surfaces that are defined by a plurality of control points. In this specification, data which shows coordinates of control points for representing a character object or a background object in the form of free-form curve and free-form surface is called three-dimensional surface data.

(2) Stationary Character Processing Program 551

The stationary character processing program 551 includes a program unit 552, as shown in FIG. 2. The program unit 552 includes a stationary image generation program.

The stationary image generation program is a computer program made up of a plurality of machine instructions, which are to be decoded and executed by the graphics control unit 113 in the stationary game machine 100. Which is to say, the stationary image generation program is used by the graphics control unit 113.

The stationary image generation program is explained in more detail below. Here, to help understand the procedure described by the stationary image generation program, the stationary image generation program is shown not in the form of machine instructions but in the form of a flowchart in FIG. 3.

Figure 3:
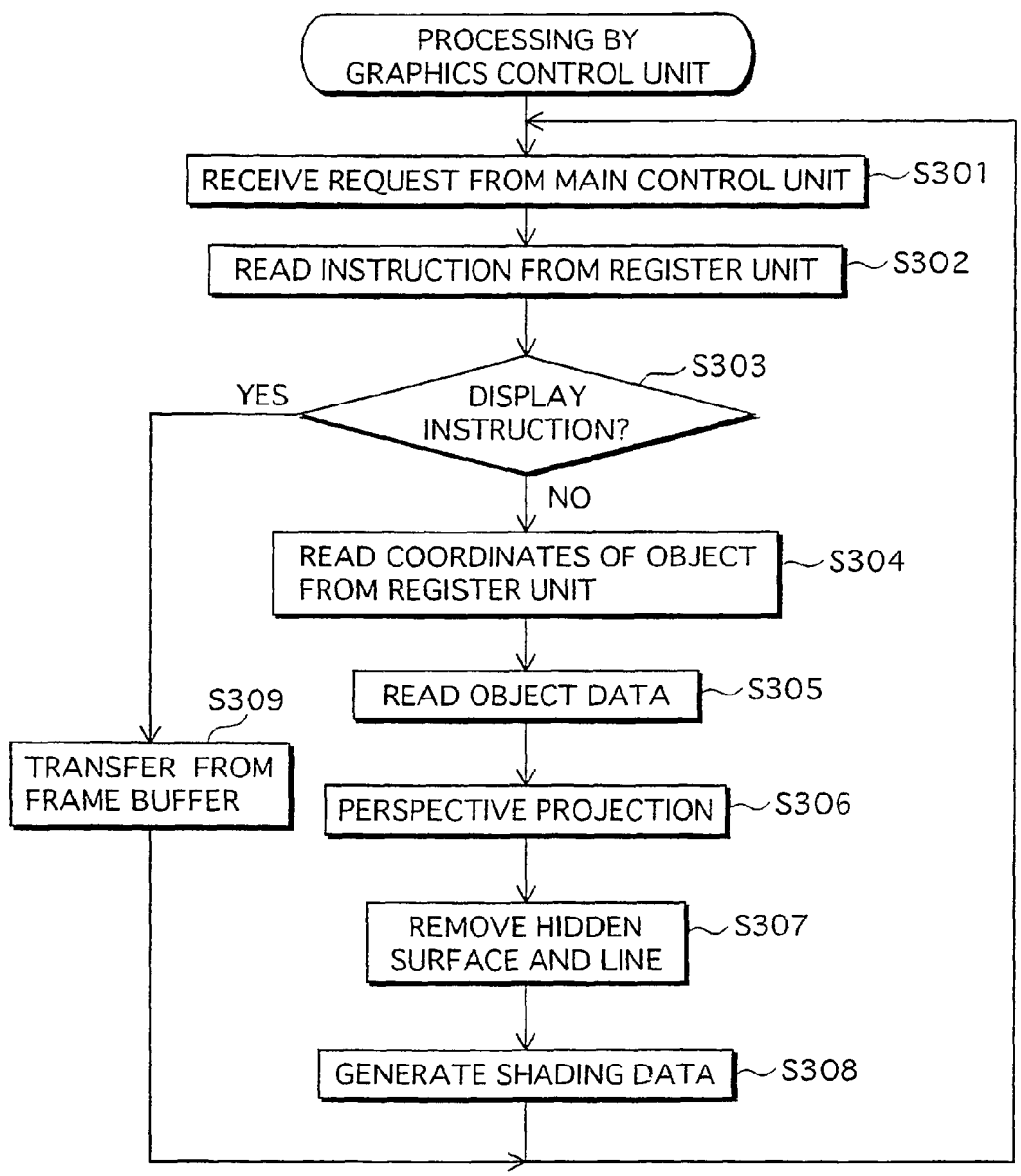
FIG. 3 is a flowchart of a stationary image generation program.

In FIG. 3, the stationary image generation program receives a control signal indicating that an instruction has been written to the register unit 109, from the main control unit 108. This control signal represents a request from the main control unit 108 to the graphics control unit 113 to generate an image (S301).

Upon receiving the control signal, the stationary image generation program reads the contents of the register R0 151 in the register 109, in which the instruction has been written by the main control unit 108 (S302).

The stationary image generation program judges whether the read instruction is a display instruction (S303). If the read instruction is a display instruction (S303: YES), the stationary image generation program transfers a frame image stored in the frame buffer 106 to the VRAM 115 during a vertical blanking interval (described later) (S309), and returns to step S301.

If the read instruction is not a display instruction (S303: NO), that is, if the read instruction is a character object generation instruction or a background object generation instruction, the stationary image generation program reads coordinates of an object subjected to the instruction from the register unit 109. In detail, the stationary image generation program reads the contents of the register R1 152 if the read instruction is a character object generation instruction, and the contents of the register R2 153 if the read instruction is a background object generation instruction (S304).

The stationary image generation program then reads object data corresponding to the read coordinates from a graphics storing unit 114 (S305).

The stationary image generation program perspective-projects the object data (S306), removes hidden surfaces and lines (S307), and generates shading data (S308). The stationary image generation program then returns to step S301.

The above perspective projection, hidden surface and line removal, and shading generation are known techniques and so their explanation has been omitted here.

(3) Portable Game Program 561

The portable game program 561 includes a program unit 571, as shown in FIG. 2.

The program unit 571 includes a portable main program for executing the same game as the stationary main program in the stationary game program 511, and a portable frame processing program for processing one frame of image in the game. Each of the computer programs is made up of a plurality of machine instructions, which are to be decoded and executed by a main control unit 208 (described later) in the portable game machine 200. Which is to say, the portable main program and the portable frame processing program are used by the main control unit 208.

Here, the portable frame processing program is called by the portable main program.

(a) Portable Main Program

The portable main program describes the procedure of the same game as the stationary main program in the stationary game program 511, in a manner suitable for use in the portable game machine 200.

(b) Portable Frame Processing Program

The portable frame processing program calculates coordinates (in three dimensions) of a character object and a background object in a game space, in accordance with the portable main program and an operation instruction received from an operation button of the portable game machine 200. The portable frame processing program writes the calculated coordinates to a main storage unit 210 in the portable game machine 200.

The portable frame processing program then calls a background object generation, instruction and a character object generation instruction.

Further, the portable frame processing program transfers a frame image stored in a frame buffer in the main storage unit 210 to a VRAM 215, during a vertical blanking interval. This completes the portable frame processing program.

(4) Portable Character Processing Program 581

The portable character processing program 581 includes a program unit 582, as shown in FIG. 2. The program unit 582 includes a portable image generation program.

The portable image generation program is a computer program made up of a plurality of machine instructions, which are to be decoded and executed by the main control unit 208 in the portable game machine 200. Which is to say, the portable image generation program is used by the main control unit 208.

Figure 5:
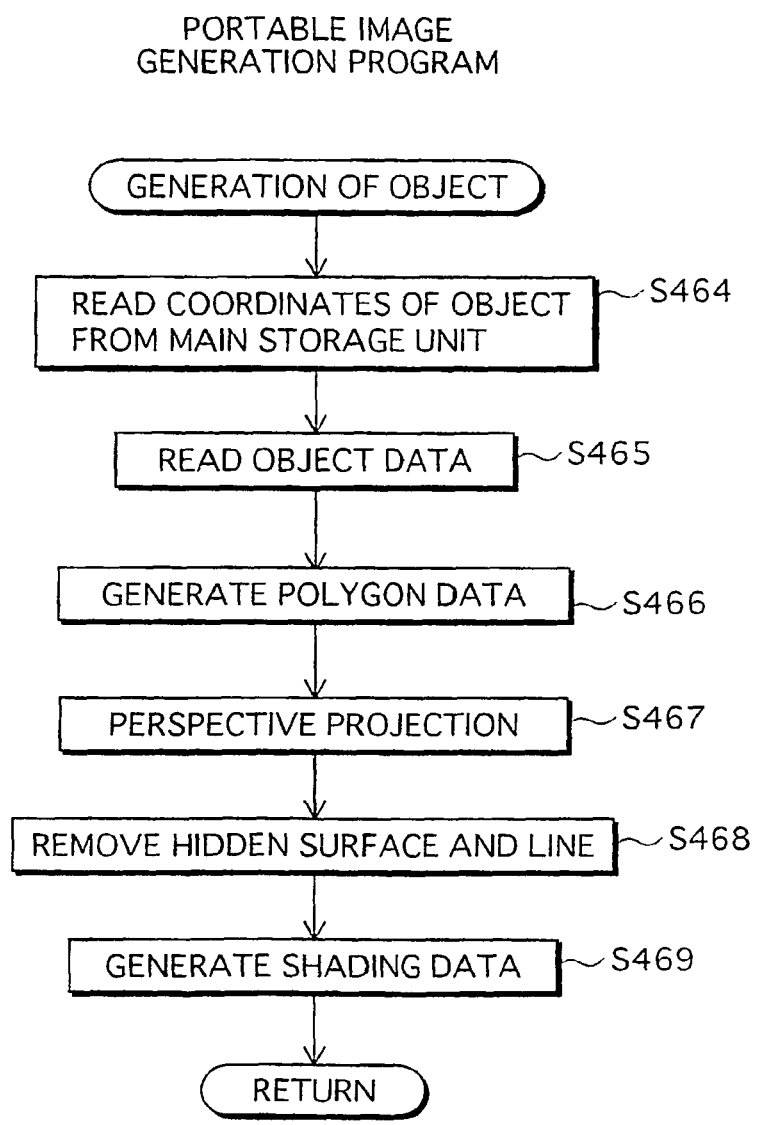
FIG. 5 is a flowchart of a portable image generation program.

The following explains the portable image generation program. Here, to help understand the procedure described by the portable image generation program, the portable image generation program is shown not in the form of machine instructions but in the form of a flowchart in FIG. 5.

The portable image generation program reads coordinates of an object to be generated, from the main storage unit 210 (S464).

The portable image generation program then reads object data corresponding to the read coordinates, from the main storage unit 210 (S465). The portable image generation program generates polygon data from the read object data (S466). The portable image generation program then perspective-projects the polygon data (S467), removes hidden surfaces and lines (S468), and generates shading data (S469).

The above polygon generation is a known technique and so its explanation has been omitted here.

1.2. Cartridge 400

Figure 4:
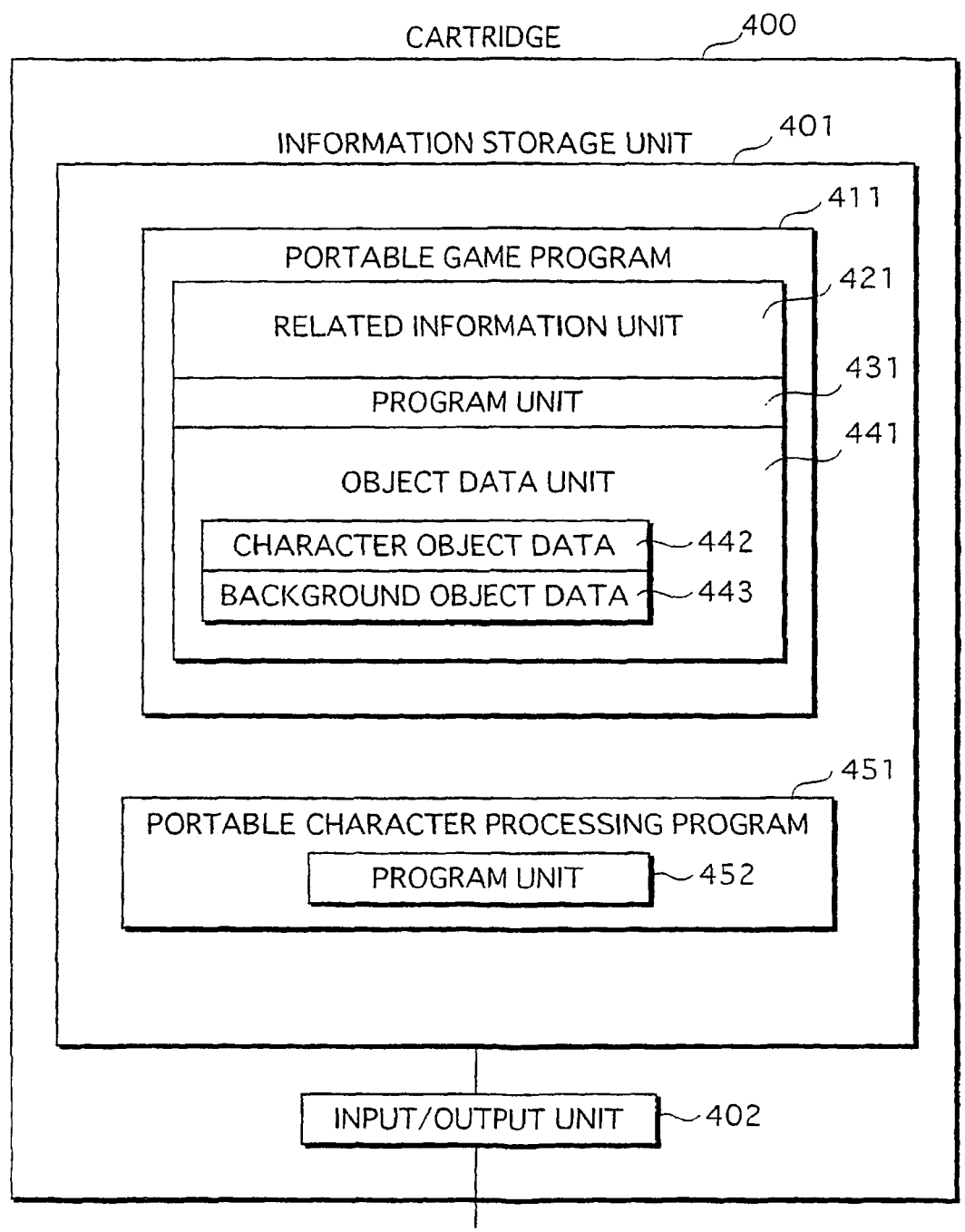
FIG. 4 is a block diagram showing a construction of a cartridge shown in FIG. 1.

FIG. 4 shows a construction of the cartridge 400. As shown in the drawing, the cartridge 400 includes an information storage unit 401 and an input/output unit 402.

(1) Information Storage Unit 401

The information storage unit 401 stores, for example, a portable game program 411 and a portable character processing program 451 beforehand, as shown in FIG. 4. The portable game program 411 and the portable character processing program 451 are computer programs and computer data for use in the portable game machine 200, and constitute portable game software.

The portable game program 411 includes a related information unit 421, a program unit 431, and an object data unit 441.

(Related Information Unit 421)

The related information unit 421 includes audio information and the like (not illustrated), like the related information unit 521 in the stationary game program 511 stored on the DVD 500.

(Program Unit 431)

The program unit 431 includes a portable main program for executing a game, and a portable frame processing program for processing one frame of image in the game. Each of these computer programs is made up of a plurality of machine instructions, which are to be decoded and executed by the main control unit 208 in the portable game machine 200. Which is to say, the portable main program and the portable frame processing program are used by the main control unit 208.

(a) Portable Main Program

The portable main program describes a procedure of the game in a manner suitable for use in the portable game machine 200.

(b) Portable Frame Processing Program

The portable frame processing program is called by the portable main program. This portable frame processing program has the same procedure as the portable frame processing program in the portable game program 561 stored on the DVD 500.

(Object Data Unit 441)

The object data unit 441 includes character object data 442, background object data 443, and other object data (not illustrated), as shown in FIG. 4.

The character object data 442 and the background object data 443 respectively show character objects and background objects in the form of polygon in a three-dimensional coordinate system. The character object data 442 and the background object data 443 are produced for use in the portable game machine 200. The size of each polygon is set beforehand depending on the display capacity and processing power of the portable game machine 200.

(Portable Character Processing Program 451)

The portable character processing program 451 includes a program unit 452, as shown in FIG. 4. The program unit 452 includes a portable image generation program.

This portable image generation program has the same procedure as the portable image generation program in the portable character processing program 581 stored on the DVD 500.

(2) Input/Output Unit 402

The input/output unit 402 performs data transfer according to a request by a device to which the cartridge 400 is connected. The device referred to here is the portable game machine 200.

1.3. Stationary Game Machine 100

Figure 6:
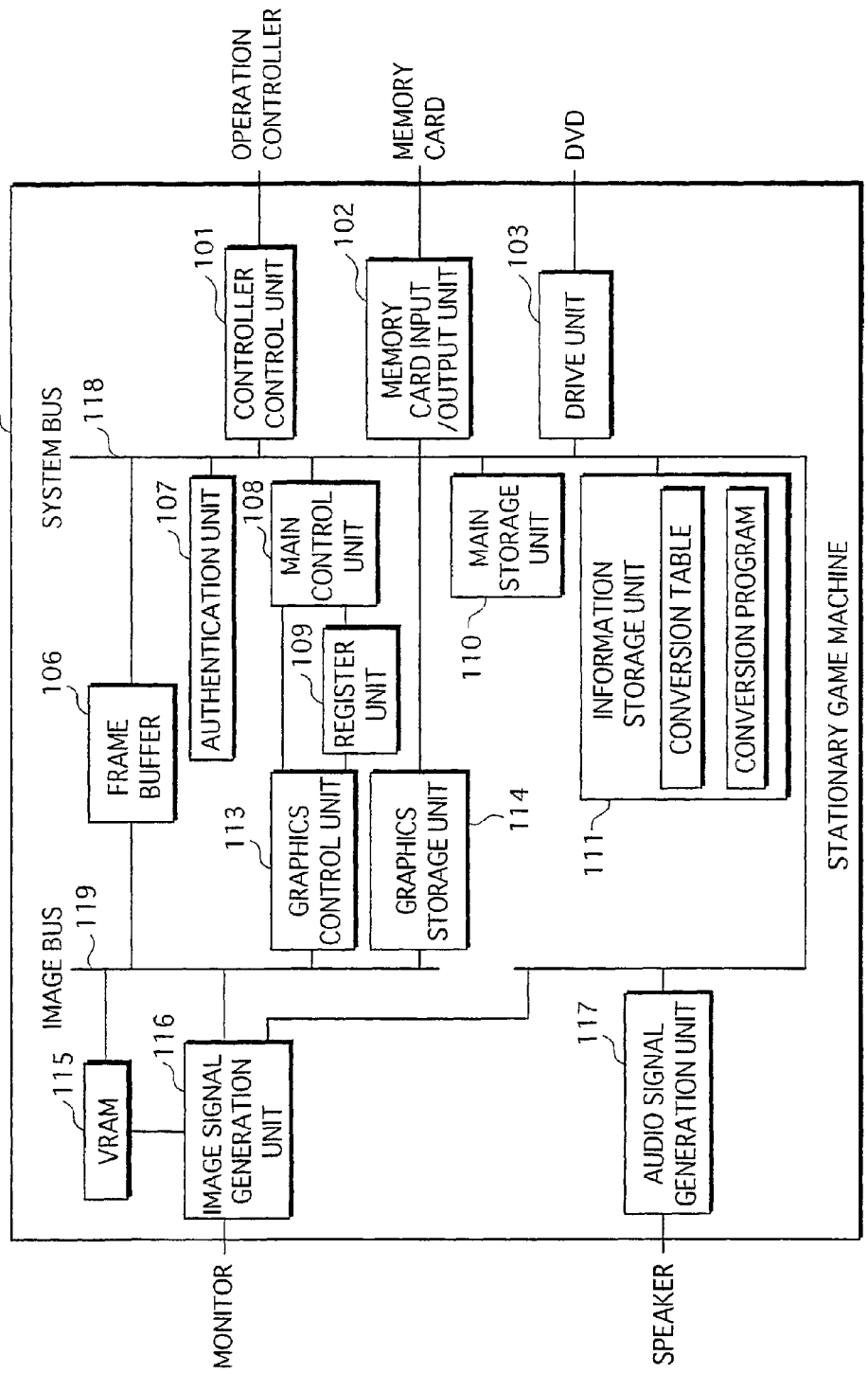
FIG. 6 is a block diagram showing a construction of a stationary game machine shown in FIG. 1.

FIG. 6 shows a construction of the stationary game machine 100. As illustrated, the stationary game machine 100 includes the controller control unit 101, a memory card input/output unit 102, a drive unit 103, the frame buffer 106, an authentication unit 107, the main control unit 108, the register unit 109, the main storage unit 110, an information storage unit 111, the graphics control unit 113, the graphics storage unit 114, the VRAM 115, an image signal generation unit 116, an audio signal generation unit 117, a system bus 118, and an image bus 119.

The controller control unit 101, the memory card input/output unit 102, the drive unit 103, the frame buffer 106, the authentication unit 107, the main control unit 108, the main storage unit 110, the information storage unit 111, the graphics storage unit 114, the image signal generation unit 116, and the audio signal generation unit 117 are connected to the system bus 118. The frame buffer 106, the graphics control unit 113, the graphics storage unit 114, the VRAM 115, and the image signal generation unit 116 are connected to the image bus 119.

As shown in FIG. 1, the operation controller 122 and a monitor 120 are connected to the stationary game machine 100. Also, the DVD 500 and the memory card 300 can be inserted in the stationary game machine 100.

(1) Operation Controller 122

The operation controller 122 has a plurality of buttons on its surface. When receiving an operation of a button from the user, the operation controller 112 outputs an operation instruction corresponding to the button to the stationary game machine 100.

(2) Controller Control Unit 101, Memory Card Input/Output Unit 102, and Drive Unit 103

The controller control unit 101 is connected to the operation controller 122. The controller control unit 101 receives an operation instruction corresponding to a button from the operation controller 122, and outputs the operation instruction to the main control unit 108 via the system bus 118.

The memory card input/output unit 102 is connected to the memory card 300 when the memory card 300 is inserted in the stationary game machine 100. Under control of the main control unit 108, the memory card input/output unit 102 reads information from the memory card 300 and outputs the read information to the main control unit 108 via the system bus 118, or receives information from the main control unit 108 via the system bus 118 and writes the received information to the memory card 300.

The drive unit 103 reads information from the DVD 500 and outputs the read information to the main control unit 108 via the system bus 118, under control of the main control unit 108.

(3) Monitor 120

The monitor 120 includes a speaker 121. The monitor 120 receives an image signal including a vertical blanking interval and a horizontal blanking interval from the image signal generation unit 116, and displays an image based on the received image signal. The speaker 121 receives an audio signal from the audio signal generation unit 117, converts the audio signal to a sound, and outputs the sound.

(4) Main Storage Unit 110, Information Storage Unit 111, and Graphics Storage Unit 114

Figure 7:
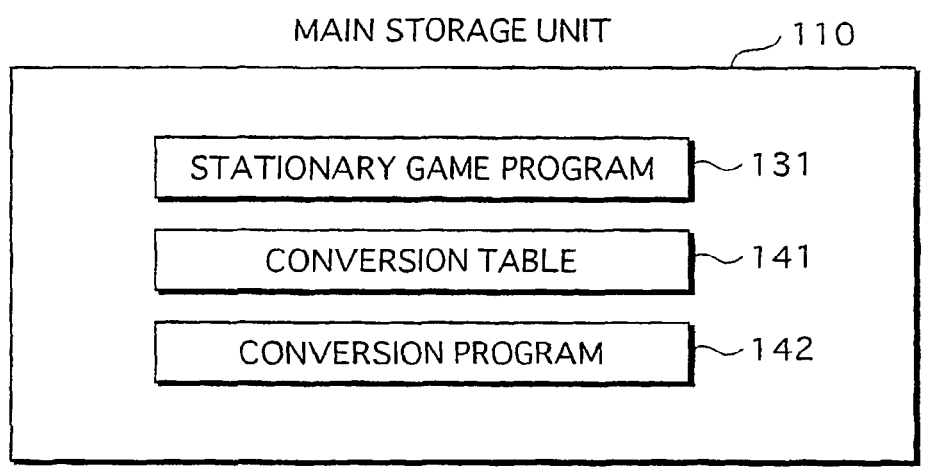
FIG. 7 shows an example of information stored in a main storage unit in the stationary game machine shown in FIG. 6.

The main storage unit 110 can be realized by a RAM. FIG. 7 shows an example of information stored in the main storage unit 110. In the drawing, the main storage unit 110 stores a stationary game program 131, a conversion table 141, and a conversion program 142.

Figure 8:
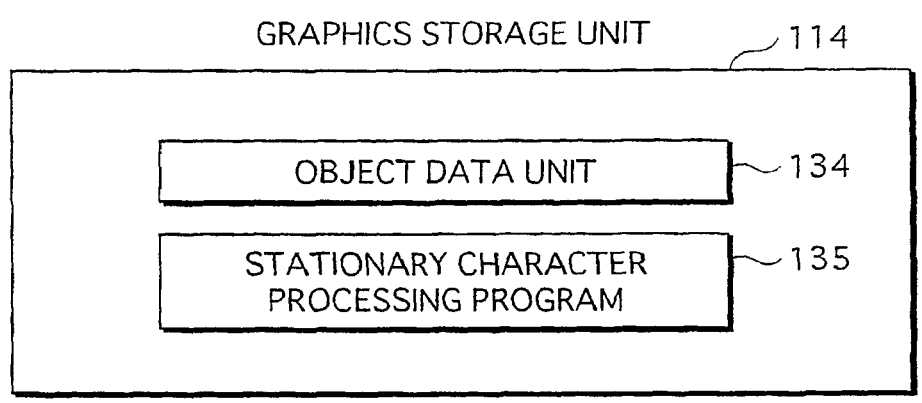
FIG. 8 shows an example of information stored in a graphics storage unit in the stationary game machine shown in FIG. 6.

The graphics storage unit 114 can be realized by a RAM. FIG. 8 shows an example of information stored in the graphics storage unit 114. In the drawing, the graphics storage unit 114 stores an object data unit 134 and a stationary character processing program 135.

The information storage unit 111 can be realized by a hard disk unit. The information storage unit 111 stores the conversion program and the conversion table. The information storage unit 111 also stores an encryption program (not illustrated). The conversion program, the conversion table, and the encryption program are computer programs and computer data for use in the stationary game machine 100. Each of the computer programs is made up of a plurality of machine instructions, which are to be decoded and executed by the main control unit 108 in the stationary game machine 100. Which is to say, the conversion program and the encryption program are used by the main control unit 108.

The conversion program is a computer program for converting object data in the form of three-dimensional surface data to polygon data, with reference to the conversion table.

Figure 10C:
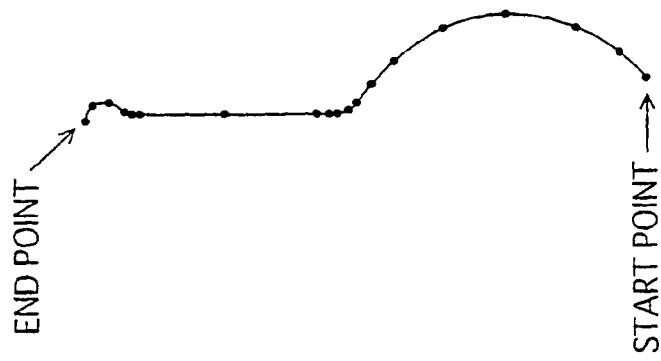
FIG. 10 shows an example of converting three-dimensional surface data to polygon data.
Figure 10B:
Figure 10A:
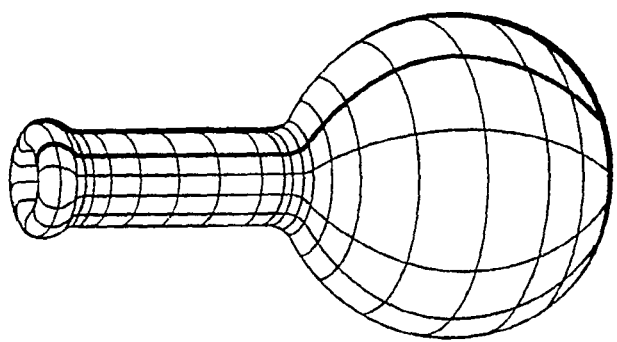

The three-dimensional surface data shows an object in the form of free-form curve and free-form surface, as shown in FIG. 10A. To convert this to polygon data, points which serve as polygon vertices are extracted and a polygon is generated from coordinates of the extracted points.

In more detail, the free-form curves in the three-dimensional surface data shown in FIG. 10A are divided into partial curves, and each partial curve is extracted as shown in FIG. 10B. Each extracted partial curve is then processed in the following way. First, a start point and an end point of the partial curve are specified. Then coordinates of polygon vertices are set according to a curvature of the partial curve from the start point to the end point, as shown in FIG. 10C. Finally, a polygon is generated based on the set polygon vertices. The polygon generation is a known technique and so its detailed explanation has been omitted here.

(Conversion Table)

FIG. 9 shows a structure of the conversion table. As illustrated, the conversion table shows lower-limit cumulative curvature $R_L$ and upper-limit polygon side length $N_{max}$ of roughness 1 and roughness 2, according to pixel size.

The pixel size shows the number of pixels of the portable game machine 200 which is expected to use copied object data. The stationary game machine 100 reads a pixel size of an LCD unit 220 equipped in the portable game machine 200 from the memory card 300, and converts object data based on the read pixel size to thereby reduce the data size of the object data.

Lower-limit cumulative curvature $R_L$ and upper-limit polygon side length $N_{max}$ are input values used by the conversion program. Lower-limit cumulative curvature $R_L$ serves as a threshold when setting a polygon vertex. Upper-limit polygon side length $N_{max}$ shows a maximum interval of adjacent polygon vertices. Polygon vertices are spaced so as not to exceed this maximum interval.

Lower-limit cumulative curvature $R_L$ and upper-limit polygon side length $N_{max}$ of roughness 2 are greater than lower-limit cumulative curvature $R_L$ and upper-limit polygon side length $N_{max}$ of roughness 1. This being so, when using lower-limit cumulative curvature $R_L$ and upper-limit polygon side length $N_{max}$ of roughness 2 as input values, the object data is converted to data of a rougher polygon than when using lower-limit cumulative curvature $R_L$ and upper-limit polygon side length $N_{max}$ of roughness 1, with it being possible to reduce the data size of the object data to a greater extent.

(Conversion Program)

Figure 11:
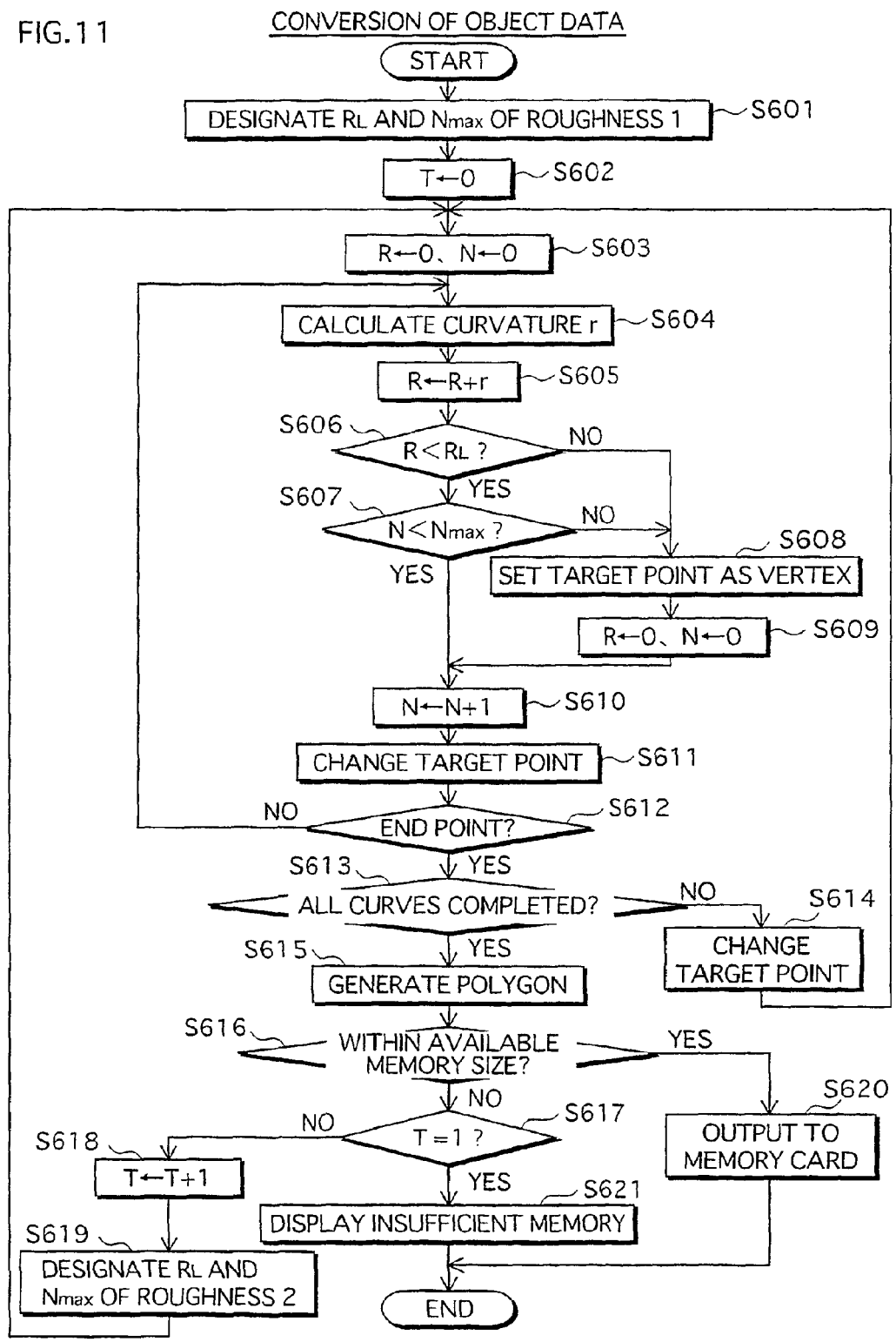
FIG. 11 is a flowchart of a conversion program stored in the information storage unit.

The conversion program is explained below. Here, to help understand how the main control unit 108 operates in accordance with the conversion program, the conversion program is shown not in the form of machine instructions but in the form of a flowchart in FIG. 11. Also, the following explanation uses the example shown in FIG. 10.

The main control unit 108 specifies lower-limit cumulative curvature $R_L$ and upper-limit polygon side length $N_{max}$ of roughness 1 that correspond to the pixel size read from the memory card 300, in the conversion table (S601).

The main control unit 108 sets conversion count T to 0 as an initial value (S602), and cumulative curvature R and polygon side length N to 0 as initial values (S603). Here, conversion count T is a variable showing whether conversion has been performed for both roughness 1 and roughness 2. Cumulative curvature R is a variable showing a cumulated curvature of the curve that is to be processed. Polygon side length N is a variable showing a distance between adjacent polygon vertices.

The main control unit 108 sets a start point and an end point of the partial curve shown in FIG. 10B, and performs the following processing while moving the target point along the partial curve from the start point to the end point.

First, the main control unit 108 calculates curvature r at the target point (S604). Curvature r is a reciprocal of a radius of curvature. This being so, when curvature r is greater, the curvedness is larger. The main control unit 108 adds calculated curvature r to cumulative curvature R (S605).

Next, the main control unit 108 judges whether cumulative curvature R is smaller than lower-limit cumulative curvature $R_L$ (S606). If R<$R_L$ (S606: YES), that is, if the curvedness is small, the main control unit 108 judges whether polygon side length N is smaller than upper-limit polygon side length $N_{max}$ (S607). If N<$N_{max}$ (S607: YES), the main control unit 108 increments polygon side length N by 1, without setting a polygon vertex (S610). As a result, the target point is moved on the partial curve (S611). The main control unit 108 judges whether the target point is at the end point of the partial curve (S612). If not (S612: NO), the main control unit 108 returns to step S604.

The main control unit 108 again calculates curvature r at the target point (S604), adds calculated curvature r to cumulative curvature R (S605), and judges whether R<$R_L$ (S606). If R≥$R_L$ (S606: NO), that is, if the curvedness is large, the main control unit 108 sets coordinates of the target point as coordinates of a polygon vertex (S608). Also, if R<$R_L$ (S606: YES) but polygon side length N is no smaller than upper-limit polygon side length $N_{max}$ (S607: NO) the main control unit 108 sets the coordinates of the target point as the coordinates of the polygon vertex (S608).

After this, the main control unit 108 assigns 0 to cumulative curvature R and polygon side length N (S609), and increments polygon side length N by 1 (S610) to move the target point on the partial curve (S611). If the target point is not at the end point (S612: NO), the main control unit 108 returns to step S604.

Thus, the main control unit 108 judges whether to set a polygon vertex, while moving the target point along the partial curve. Once the target point has reached the endpoint of the partial curve (S612: YES), the main control unit 108 judges whether there is any partial curve which has not been processed yet (S613). If there is any unprocessed partial curve (S613: NO), the main control unit 108 sets the target point at a start point of the unprocessed partial curve (S614), and returns to step S603.

Once all partial curves have been processed (S613: YES), the main control unit 108 generates a polygon based on the set coordinates of the polygon vertices (S615).

The main control unit 108 judges whether a total size of the object data, which is converted from three-dimensional surface data to polygon data in the above way, and the portable game program 561 and the portable character processing program 581 stored on the DVD 500 is within an available memory size of the memory card 300 (S616). If the total size is within the available memory size of the memory card 300 (S616: YES), the main control unit 108 outputs portable game software that is made up of the converted object data, the portable game program 561, and the portable character processing program 581, to the memory card 300 (S620).

If the total size exceeds the available memory size of the memory card 300 (S616: NO), the main control unit 108 judges whether conversion count T is 1 (S617). If not (S617: NO), the main control unit 108 increments conversion count T by 1 (S618), selects lower-limit cumulative curvature $R_L$ and upper-limit polygon side length $N_{max}$ of roughness 2 that correspond to the pixel size read from the memory card 300 in the conversion table (S619), and returns to step S603. If conversion count T is 1 (S617: YES), that is, if conversion has already been performed for both roughness 1 and roughness 2, the main control unit 108 displays a message indicating that no rougher image is available (S621), and ends the operation.

Note that a method of determining a polygon side length according to curvature is a known technique as described in Japanese Patent Application Publication No. H09-171567, so that its detailed explanation has been omitted.

(5) Register Unit 109

Figure 13:
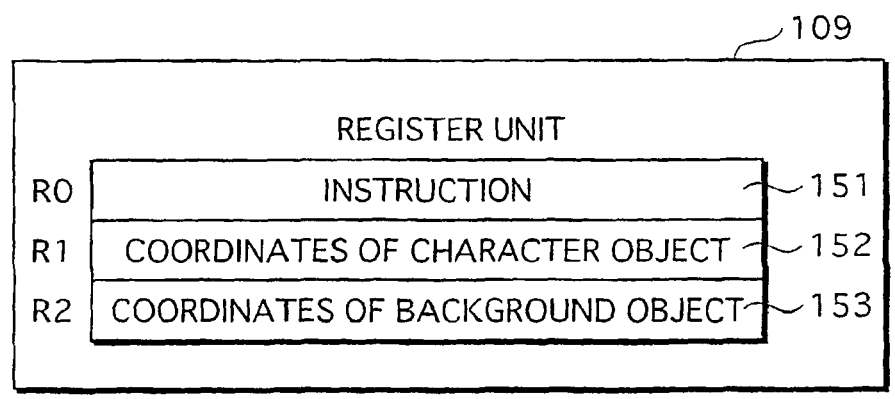
FIG. 13 shows contents of each register in a register unit in the stationary game machine shown in FIG. 6.

FIG. 13 shows a structure of the register unit 109. As illustrated, the register unit 109 has three registers that are the register R0 151, the register R1 152, and the register R2 153. Each of these registers is 128 bits long.

The register unit 109 is connected to both the main control unit 108 and the graphics control unit 113.

The register R0 151, the register R1 152, and the register R2 153 are used for the following predetermined purposes.

Figure 14:
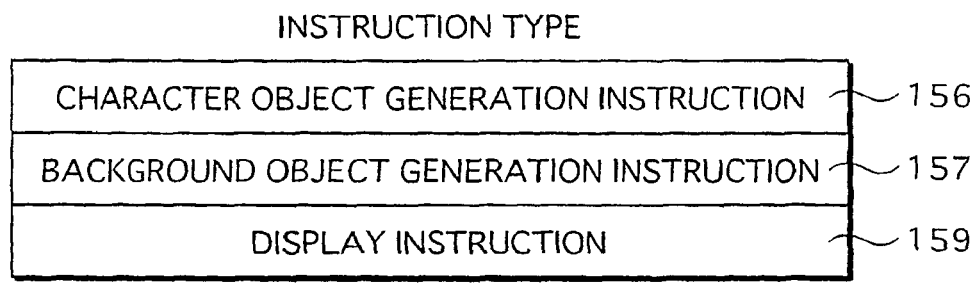
FIG. 14 shows types of instructions stored in register R0 in the register unit.

The register R0 151 is used for storing an instruction by the main control unit 108. FIG. 14 shows types of instructions stored in the register R0 151. As illustrated, one of a character object generation instruction 156, a background object generation instruction 157, and a display instruction 159 is stored in the register R0 151.

The character object generation instruction 156 is an instruction to generate an image of a character object, and the background object generation instruction 157 is an instruction to generate an image of a background object. The display instruction 159 is an instruction to transfer a frame image stored in the frame buffer 106 to the VRAM 115.

The register R1 152 is used for storing coordinates of a character object, whereas the register R2 153 is used for storing coordinates of a background object. Here, three 32-bit units of each of the register R1 152 and the register R2 153 from the most significant bit are used to respectively store X, Y, and Z coordinates.

(6) Frame Buffer 106

The frame buffer 106 has an area for storing one frame of image. Such a frame image has 256,000 pixels made up of a matrix of 400 vertical pixels and 640 horizontal pixels.

(7) Authentication Unit 107

Before the main control unit 108 starts communication or information transfer with an external device which is connected to the stationary game machine 100, the authentication unit 107 performs mutual authentication with the external device according to a challenge-response protocol under control of the main control unit 108.

The challenge-response protocol is a known technique and so its explanation has been omitted here.

The authentication unit 107 outputs a result of authenticating the external device to the main control unit 108. If the authentication has failed, the authentication unit 107 prohibits the main control unit 108 to perform communication or information transfer with the external device. If the authentication has succeeded, the authentication unit 107 permits the main control unit 108 to perform communication or information transfer with the external device.

The external device referred to here is the memory card 300.

(8) Main Control Unit 108

The main control unit 108 can actually be realized by a microprocessor and a RAM (not illustrated). A computer program is stored in the RAM, the main storage unit 110, or the information storage unit 111. The functions of the main control unit 108 can be achieved by the microprocessor operating in accordance with this computer program.

(Menu Display)

Figure 15:
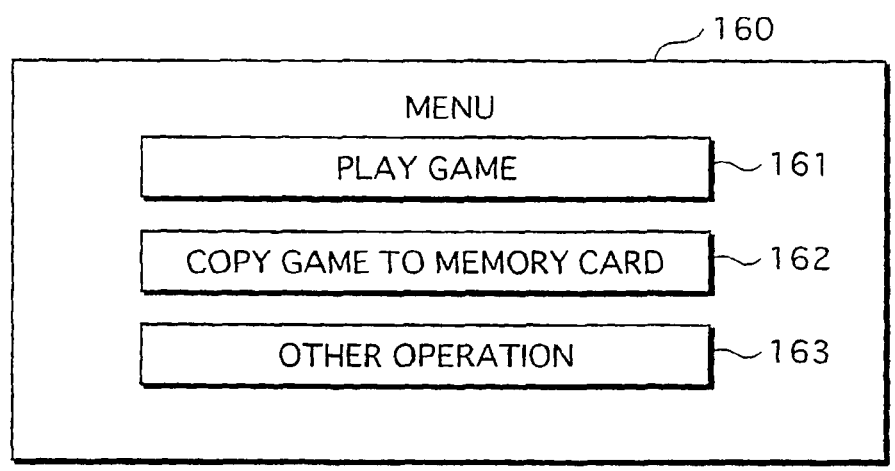
FIG. 15 shows an example menu generated by a main control unit in the stationary game machine shown in FIG. 6.

When the user activates the stationary game machine 100, the main control unit 108 generates a menu screen, such as a menu screen 160 shown in FIG. 15. The menu screen 160 contains a plurality of options 161, 162, and 163.

The option 161 is used to play a game.

The option 162 is used to copy stationary game software to the memory card 300.

The option 163 is used to perform other operations.

When the user selects one of the options 161, 162, and 163, the main control unit 108 receives an operation instruction corresponding to the selected option from the operation controller 122 via the controller control unit 101, and performs an operation corresponding to the operation instruction.

(Game Play)

When the user selects the option 161, the main control unit 108 reads the stationary game program 511 from the DVD 500, and writes the stationary game program 511 to the main storage unit 110. The main control unit 108 reads the object data unit 541 from the stationary game program 511, and writes the object data unit 541 to the graphics storage unit 114. The main control unit 108 also reads the stationary character processing program 551 from the DVD 500, and writes the stationary character processing program 551 to the graphics storage unit 114.

Next, the main control unit 108 fetches one instruction at a time from the program unit 531 in the stationary game program 511 stored in the main storage unit 110, decodes the fetched instruction, and executes the decoded instruction. The fetch, decode, and execution are repeated for each instruction in the program unit 531.

(Copying of Stationary Game Software)

When the user selects the option 162, the main control unit 108 outputs copy inquiry information for inquiring whether stationary game software can be copied to the memory card 300, to the memory card 300 via the memory card input/output unit 102.

If the main control unit 108 receives from the memory card 300 copy prohibition information indicating that the stationary game software cannot be copied to the memory card 300, the main control unit 108 generates a copy prohibition screen notifying the user that the copy is prohibited, and writes the copy prohibition screen to the frame buffer 106.

If the main control unit 108 receives from the memory card 300 copy permission information indicating that the stationary game software can be copied to the memory card 300 together with a public key certificate of the memory card 300, the pixel size of the portable game machine 200, and the available memory size of the memory card 300, the main control unit 108 writes the public key certificate, the pixel size, and the available memory size to the main storage unit 110. The main control unit 108 reads the object data unit 541 in the stationary game program 511 from the DVD 500, and writes the object data unit 541 to the main storage unit 110. The main control unit 108 also reads the conversion program and the conversion table from the information storage unit 111, and writes the conversion program and the conversion table to the main storage unit 110.

Next, the main control unit 108 fetches one instruction at a time from the conversion program stored in the main storage unit 110, decodes the fetched instruction, and executes the decoded instruction. The fetch, decode, and execution are repeated for each instruction in the conversion program, as a result of which the object data in the object data unit 541 stored on the DVD 500 in the form of three-dimensional surface data is converted to polygon data.

Figure 12:
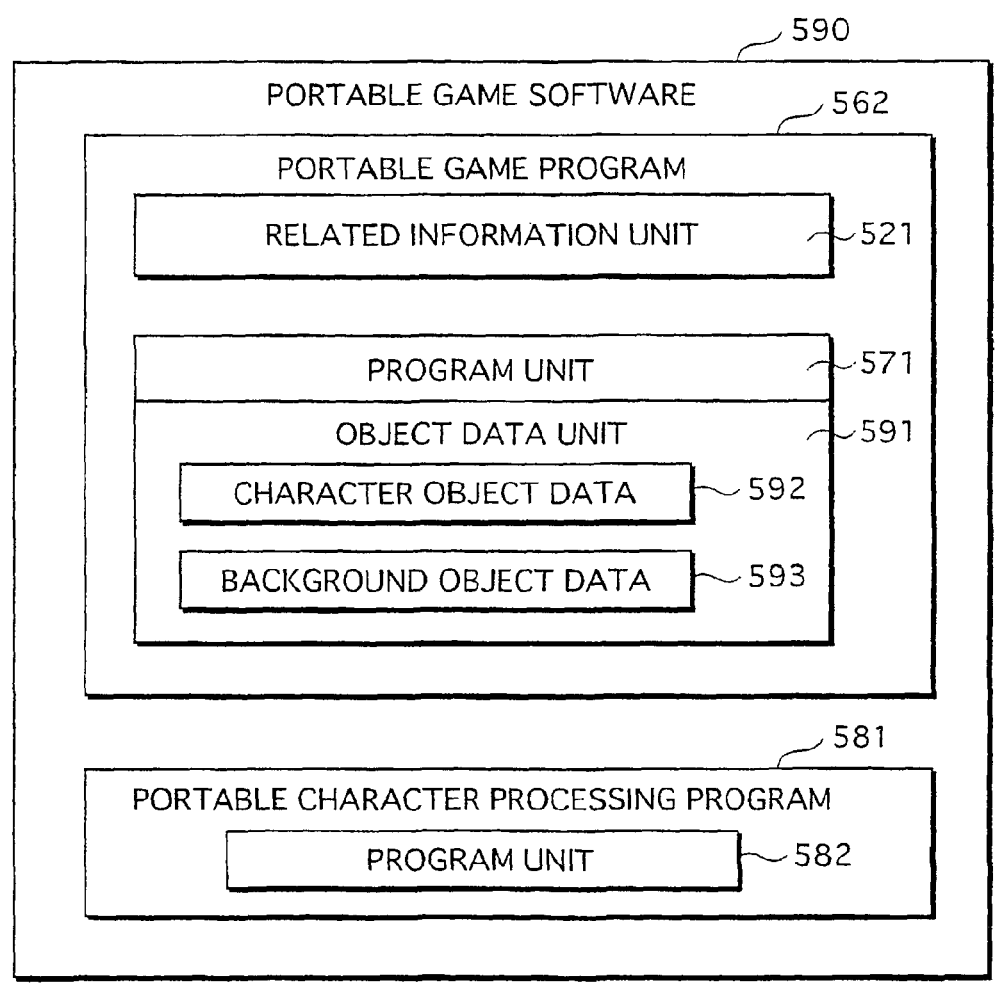
FIG. 12 shows a structure of portable game software.

After this, the main control unit 108 generates portable game software, such as portable game software 590 shown in FIG. 12. The portable game software 590 is made up of a portable game program 562 and the portable character processing program 581. The portable game program 562 is made up of the related information unit 521, the program unit 571, and an object data unit 591. The object data unit 591 includes character object data 592 and background object data 593 that are obtained by converting the character object data 542 and the background object data 543 in the object data unit 541 stored on the DVD 500. The main control unit 108 encrypts the generated portable game software using a public key contained in the public key certificate stored in the main storage unit 110, according to encryption algorithm E2. The main control unit 108 outputs the encrypted portable game software to the memory card 300 via the memory card input/output unit 102.

Encryption algorithm E2 referred to here is a public-key encryption algorithm such as RSA. Since RSA is a known technique, its explanation has been omitted.

(9) Graphics Control Unit 113

The graphics control unit 113 can actually be realized by a graphics processor (not illustrated).

The graphics control unit 113 fetches one instruction at a time from the stationary character processing program stored in the graphics storage unit 114, decodes the fetched instruction, and executes the decoded instruction. The fetch, decode, and execution are repeated for each instruction in the stationary character processing program.

(10) VRAM 115

The VRAM 115 has an area for storing one frame of image. Such a frame image has 256,000 pixels made up of a matrix of 400 vertical pixels and 640 horizontal pixels. This frame image has the same size as the frame image stored in the frame buffer 106.

(11) Image Signal Generation Unit 116

The image signal generation unit 116 performs the following processing (a) and (b), in units of 1/60 second.

(a) Generate a vertical synchronizing signal, and output the vertical synchronizing signal to the monitor 120. This period is called a vertical blanking interval.

(b) Perform steps (b1) to (b3) 400 times that correspond to the number of vertical pixels of the frame image stored in the VRAM 115.

(b1) Read one horizontal line of pixels (640 pixels) of the frame image stored in the VRAM 115.

(b2) Generate one line of image signal and a horizontal synchronizing signal, from the read pixels. (b3) Output the generated image signal and horizontal synchronizing signal to the monitor 120.

(12) Audio Signal Generation Unit 117

Under control of the main control unit 108, the audio signal generation unit 117 reads digital audio information from the main storage unit 110, decodes the read audio information, converts the decoded audio information to an analog audio signal, and outputs the analog audio signal to the speaker 121.

1.4. Portable Game Machine 200

Figure 16:
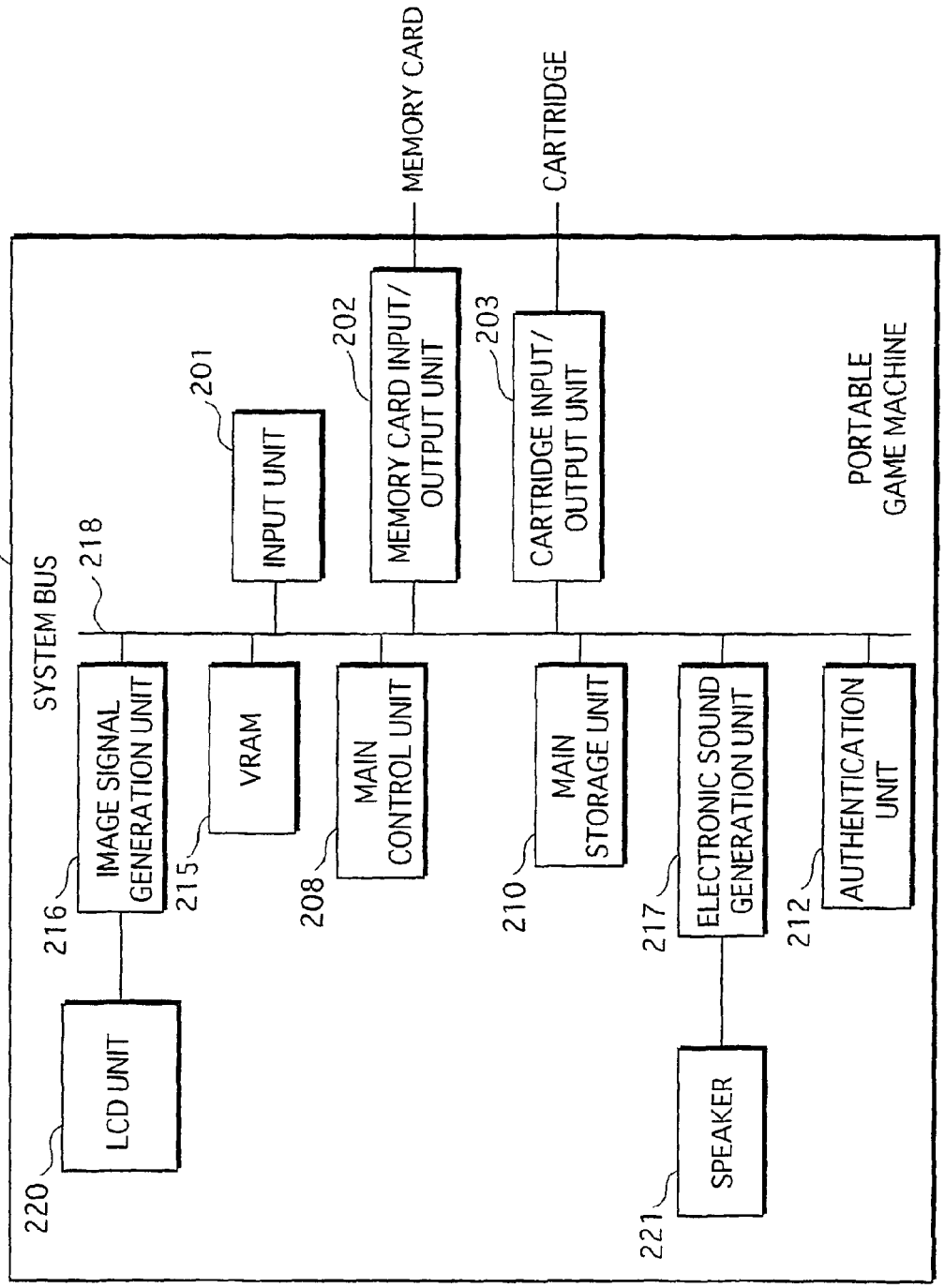
FIG. 16 is a block diagram showing a construction of a portable game machine shown in FIG. 1.

FIG. 16 shows a construction of the portable game machine 200. In the drawing, the portable game machine 200 includes an input unit 201, a memory card input/output unit 202, a cartridge input/output unit 203, the main control unit 208, the main storage unit 210, an authentication unit 212, the VRAM 215, an image signal generation unit 216, an electronic sound generation unit 217, a system bus 218, the LCD unit 220, and a speaker 221.

The input unit 201, the memory card input/output unit 202, the cartridge input/output unit 203, the main control unit 208, the main storage unit 210, the authentication unit 212, the VRAM 215, the image signal generation unit 216, and the electronic sound generation unit 217 are connected to the system bus 218.

Also, the cartridge 400 and the memory card 300 can be inserted in the portable game machine 200.

(1) Input Unit 201

The input unit 201 is equipped with a plurality of buttons. Upon receiving an operation on any of the buttons from the user, the input unit 201 generates an operation instruction corresponding to the button, and outputs the operation instruction to the main control unit 208 via the system bus 218.

(2) Memory Card Input/Output Unit 202 and Cartridge Input/Output Unit 203

The memory card input/output unit 202 is connected to the memory card 300 when the memory card 300 is inserted in the portable game machine 200. Under control of the main control unit 208, the memory card input/output unit 202 reads information from the memory card 300 and outputs the read information to the main control unit 208 via the system bus 218, or receives information from the main control unit 208 via the system bus 218 and writes the received information to the memory card 300.

The cartridge input/output unit 203 reads information from the cartridge 400 and outputs the read information to the main control unit 208 via the system bus 218, under control of the main control unit 208.

(3) LCD Unit 220 and Speaker 221

The LCD unit 220 receives an image signal including a vertical blanking interval and a horizontal blanking interval from the image signal generation unit 216, and displays an image based on the received image signal.

The speaker 221 receives an audio signal from the electronic sound generation unit 217, converts the audio signal to a sound, and outputs the sound.

(4) Main Storage Unit 210

Figure 17:
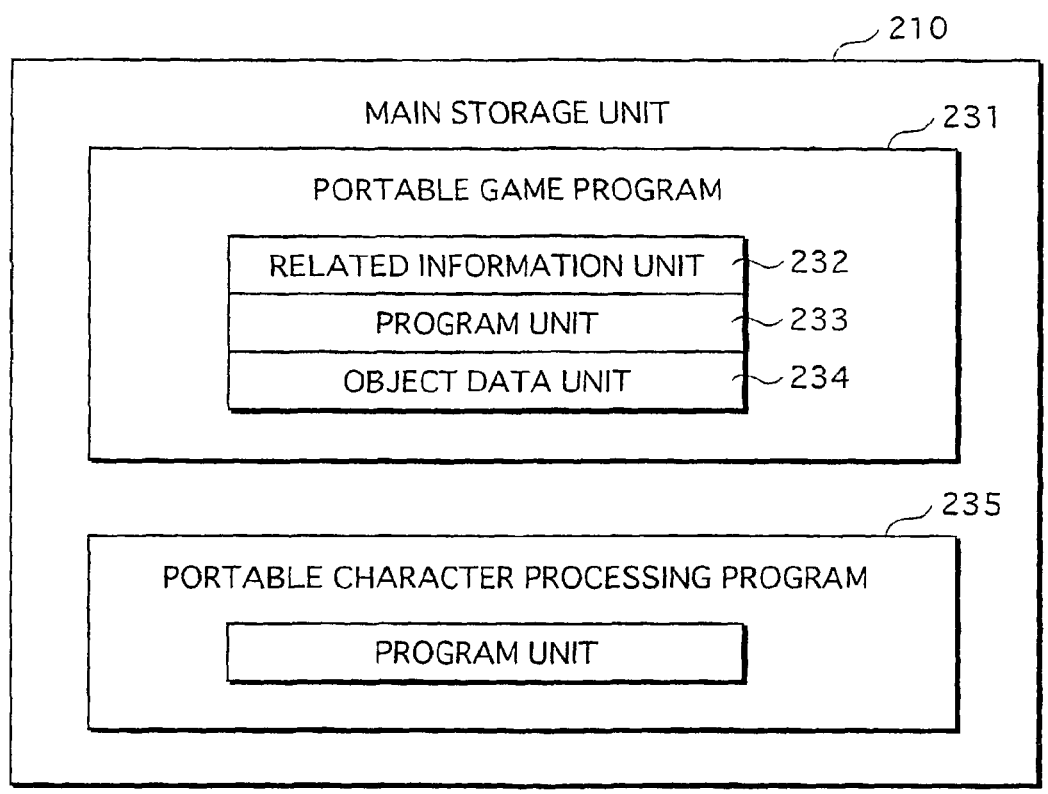
FIG. 17 shows an example of information stored in a main storage unit in the portable game machine shown in FIG. 16.

The main storage unit 210 can be realized by a RAM. FIG. 17 shows an example of information stored in the main storage unit 210. In the drawing, the main storage unit 210 stores a portable game program 231 and a portable character processing program 235. The portable game program 231 includes a related information unit 232, a program unit 233, and an object data unit 234.

The main storage unit 210 also has a frame buffer. The frame buffer has an area for storing one frame of image. Such a frame image has 64,000 pixels made up of a matrix of 200 vertical pixels and 320 horizontal pixels.

(5) Authentication Unit 212

Before the main control unit 208 starts communication or information transfer with an external device connected to the portable game machine 200, the authentication unit 212 performs mutual authentication with the external device according to a challenge-response protocol under control of the main control unit 208.

The authentication unit 212 outputs a result of authenticating the external device, to the main control unit 208. If the authentication has failed, the authentication unit 212 prohibits the main control unit 208 to perform communication or information transfer with the external device. If the authentication has succeeded, the authentication unit 212 permits the main control unit 208 to perform communication or information transfer with the external device.

The external device referred to here is the memory card 300.

(6) Main Control Unit 208

The main control unit 208 can actually be realized by a microprocessor and a RAM (not illustrated). A computer program is stored in the RAM or the main storage unit 210. The functions of the main control unit 208 can be achieved by the microprocessor operating in accordance with this computer program.

(Menu Display)

Figure 18:
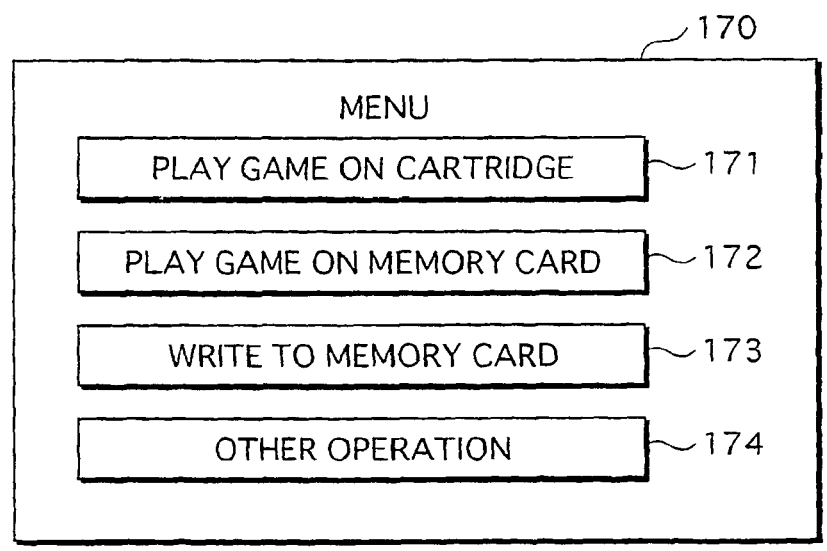
FIG. 18 shows an example menu generated by a main control unit in the portable game machine shown in FIG. 16.

When the user activates the portable game machine 200, the main control unit 208 generates a menu screen such as a menu screen 170 shown in FIG. 18, which is similar to the menu screen 160. The main control unit 208 writes the generated menu screen to the VRAM 215 during a vertical blanking interval.

In FIG. 18, the menu screen 170 contains four options 171 to 174.

The option 171 is used to play a game stored on the cartridge 400.

The option 172 is used to play a game stored on the memory card 300.

The option 173 is used to write the pixel size of the LCD unit 220 in the portable game machine 200 to the memory card 300.

The option 174 is used to perform other operations.

When the user selects one of the options 171 to 174, the main control unit 208 receives an operation instruction corresponding to the selected option from the input unit 201, and performs an operation corresponding to the operation instruction.

(Writing of a Pixel Size)

When the user selects the option 173, the main control unit 208 reads the pixel size of the LCD unit 220, and outputs the pixel size to the memory card 300 via the memory card input/output unit 202.

(Game Play)

When the user selects the option 172, the main control unit 208 instructs the authentication unit 212 to perform mutual authentication with the memory card 300. If the authentication has succeeded, the main control unit 208 performs the following processing. If the authentication has failed, the main control unit 208 terminates the operation.

The main control unit 208 reads the portable game program 562 from the memory card 300, and writes it to the main storage unit 210. The main control unit 208 also reads the portable character processing program 581 from the memory card 300, and writes it to the main storage unit 210.

Next, the main control unit 208 fetches one instruction at a time from the program unit 571 in the portable game program 562 stored in the main storage unit 210, decodes the fetched instruction, and executes the decoded instruction. The fetch, decode, and execution are repeated for each instruction in the program unit 571.

The same applies to the portable game program 411 stored on the cartridge 400.

The main control unit 208 also fetches one instruction at a time from the program unit 582 in the portable character processing program 581 stored in the main storage unit 210, decodes the fetched instruction, and executes the decoded instruction. The fetch, decode, and execution are repeated for each instruction in the program unit 582.

The same applies to the portable character processing program 451 stored on the cartridge 400.

(7) VRAM 215

The VRAM 215 has an area for storing one frame of image. Such a frame image has 64,000 pixels made up of a matrix of 200 vertical pixels and 320 horizontal pixels. This frame image has the same size as the frame image stored in the frame buffer in the main storage unit 210.

(8) Image Signal Generation Unit 216

The image signal generation unit 216 performs the following processing (a) and (b), in units of 1/60 second.

(a) Generate a vertical synchronizing signal, and output the vertical synchronizing signal to the LCD unit 220. This period is called a vertical blanking interval.

(b) Repeat steps (b1) to (b3) 200 times that correspond to the number of vertical pixels of the frame image stored in the VRAM 215.

(b1) Read one horizontal line of pixels (320 pixels) of the frame image stored in the VRAM 215.

(b2) Generate one line of image signal and a horizontal synchronizing signal from the read pixels.

(b3) Output the generated image signal and horizontal synchronizing signal to the LCD unit 220.

(9) Electronic Sound Generation Unit 217 and Speaker 221

The electronic sound generation unit 217 reads digital audio information from the main storage unit 210, decodes the audio information, converts the decoded audio information to an analog audio signal, and outputs the analog audio signal to the speaker 221, under control of the main control unit 208.

The speaker 221 receives the audio signal from the electronic sound generation unit 217, and outputs a sound.

1.5. Memory Card 300

Figure 19:
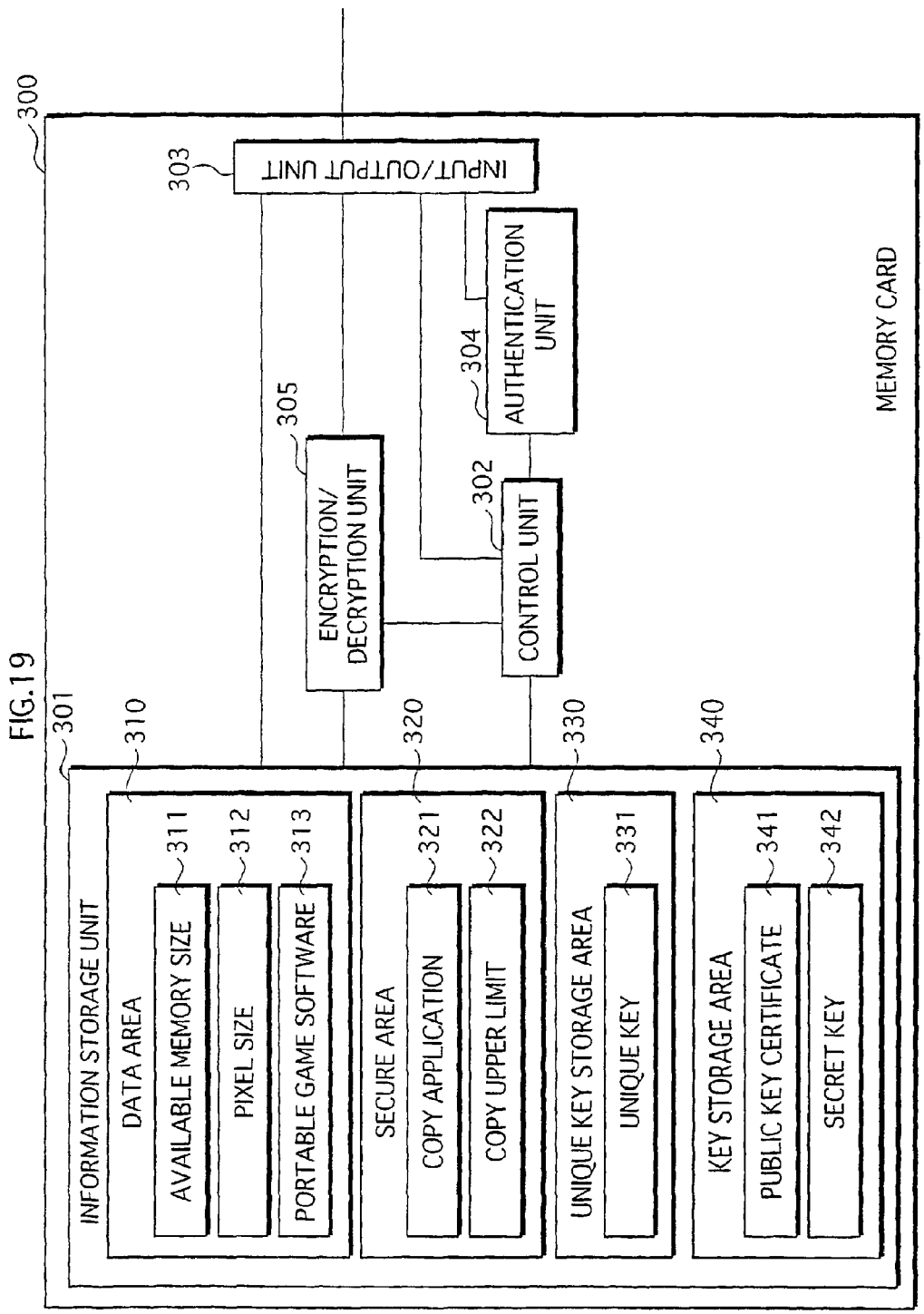
FIG. 19 is a block diagram showing a construction of a memory card shown in FIG. 1.

FIG. 19 shows a construction of the memory card 300. As shown in the drawing, the memory card 300 includes an information storage unit 301, a control unit 302, an input/output unit 303, an authentication unit 304, and an encryption/decryption unit 305.

The memory card 300 can actually be realized by a computer system that includes a microprocessor, a ROM, a RAM, and the like. A computer program is stored in the RAM. The functions of the memory card 300 can be achieved by the microprocessor operating in accordance with this computer program.

The memory card 300 is inserted in an external device. The memory card 300 receives information from the external device and stores the received information, or outputs information to the external device.

The external device referred to here is any of the stationary game machine 100, the portable game machine 200, and the mobile telephone 700.

(1) Information Storage Unit 301

The information storage unit 301 has a data area 310, a secure area 320, a unique key storage area 330, and a key storage area 340.

(a) Data Area 310

The data area 310 can be freely accessed by the external device. The data area 310 stores an available memory size 311 which shows the remaining storage capacity of the data area 310. Also, the data area 310 has an area for storing a pixel size 312 which shows the pixel size of the portable game machine 200, and an area for storing portable game software 313 in encrypted form.

(b) Secure Area 320

The secure area 320 is accessible only by the external device that has succeeded in mutual authentication with the memory card 300.

The secure area 320 has an area for storing a copy application 321 and an area for storing a copy upper limit 322, which are downloaded from the server device 600.

The copy application 321 is application software for performing judgment on copyability and executing copying. The copy upper limit 322 shows the number of times stationary game software can be copied to the memory card 300.

A copy operation is described in detail later.

(c) Unique Key Storage Area 330

The unique key storage area 330 cannot be accessed from outside the memory card 300. The unique key storage area 330 stores a unique key 331 that is unique to the memory card 300, beforehand.

(d) Key Storage Area 340

The key storage area 340 stores a public key certificate 341 and a secret key 342.

The public key certificate 341 contains the public key of the memory card 300, and attests to the validity of the public key. The public key certificate 341 is issued by a CA (Certificate Authority). The CA is a trustable third party that issues public key certificates of devices belonging to the game system 10.

The secret key 342 corresponds to the public key contained in the public key certificate 341.

(2) Input/Output Unit 303

The input/output unit 303 reads information from the information storage unit 301 and outputs the read information to the external device, or receives information from the external device and writes the received information to the information storage unit 301, under control of the control unit 302.

(3) Control Unit 302

The control unit 302 controls the authentication unit 304 to perform mutual authentication with the external device, before starting communication or information transfer with the external device. If the authentication has succeeded, the control unit 302 performs communication or information transfer with the external device. If the authentication has failed, the control unit 302 does not perform communication or information transfer with the external device.

The control unit 302 receives information from the external device via the input/output unit 303, and writes the received information to the information storage unit 301. Also, the control unit 302 reads information from the information storage unit 301, and outputs the read information to the external device via the input/output unit 303.

(Download of the Copy Application)

When receiving an operation instruction to download the copy application from the mobile telephone 700 via the input/output unit 303 as a result of the user's operation on the mobile telephone 700, the control unit 302 connects to the Internet 20 using the communication function of the mobile telephone 700. The control unit 302 accesses the server device 600, and downloads the copy upper limit and the copy application. The control unit 302 stores the downloaded copy upper limit and copy application to the secure area 320 in the information storage unit 301, as the copy upper limit 322 and the copy application 321.

(Acquisition of the Pixel Size of the Portable Game Machine 200)

When receiving the pixel size from the portable game machine 200 via the input/output unit 303 as a result of the user's operation on the portable game machine 200, the control unit 302 stores the pixel size to the data area 310 in the information storage unit 301 as the pixel size 312.

(Copying of Stationary Game Software)

When receiving copy inquiry information from the stationary game machine 100 via the input/output unit 303, the control unit 302 judges whether the copy upper limit 322 in the secure area 320 is no less than 1. If the copy upper limit 322 is below 1, the control unit 302 outputs copy prohibition information to the stationary game machine 100 via the input/output unit 303.

If the copy upper limit 322 is no less than 1, the control unit 302 reads the available memory size 311 and the pixel size 312 from the data area 310, reads the public key certificate 341 from the key storage unit 340, and sets these information as a conversion condition. The control unit 302 adds the conversion condition to copy permission information, and outputs them to the stationary game machine 100 via the input/output unit 303.

When receiving encrypted portable game software from the stationary game machine 100 via the input/output unit 303, the control unit 302 instructs the encryption/decryption unit 305 to decrypt the encrypted portable game software, to generate portable game software. After this, the control unit 302 locally encrypts the portable game software using the unique key 331 in the unique key storage area 330, and writes the encrypted portable game software to the data area 310 as the portable game software 313.

(Output of Portable Game Software)

When receiving a request for the portable game software from the portable game machine 200 via the input/output unit 303, the control unit 302 reads the portable game software 313 in encrypted form from the data area 310. The control unit 302 instructs the encryption/decryption unit 305 to decrypt the portable game software 313 using the unique key 331, and outputs the decrypted portable game software to the portable game machine 200 via the input/output unit 303.

(4) Authentication Unit 304

Before the control unit 302 starts communication or information transfer with the external device to which the memory card 300 is inserted, the authentication unit 304 performs mutual authentication with the external device according to a challenge-response protocol under control of the control unit 302.

The authentication unit 304 outputs a result of authenticating the external device, to the control unit 302. If the authentication has failed, the authentication unit 304 prohibits the control unit 302 to perform communication or information transfer with the external device. If the authentication has succeeded, the authentication unit 304 permits the control unit 302 to perform communication or information transfer with the external device.

(5) Encryption/Decryption Unit 305

(a) Decryption of Encrypted Portable Game Software

Under control of the control unit 302, the encryption/decryption unit 305 reads the secret key 342 from the key storage area 340, and decrypts the portable game software Which has been encrypted using the public key according to encryption algorithm E2, using the secret key 342 according to decryption algorithm D2. Here, decryption algorithm D2 is an inverse of encryption algorithm E2.

(b) Encryption of the Decrypted Portable Game Software

The encryption/decryption unit 305 reads the unique key 331 from the unique key storage unit 330, and encrypts the portable game software obtained by the above decryption using the unique key 331 according to encryption algorithm E1. The encryption/decryption unit 305 stores the encrypted portable game software to the data area 310 as the portable game software 313. As one example, encryption algorithm E1 is DES. Since DES is a known technique, its explanation has been omitted here.

(c) Decryption of the Portable Game Software 313

Under control of the control unit 302, the encryption/decryption unit 305 reads the portable game software 313 in encrypted form from the data area 310, and decrypts the portable game software 313 using the unique key 331 according to decryption algorithm D1 to generate the portable game software. Here, decryption algorithm D1 is an inverse of encryption algorithm E1. The encryption/decryption unit 305 outputs the generated portable game software to the control unit 302.

2. Operation of the Game System 10

2.1. Copy of Stationary Game Software

Figure 20:
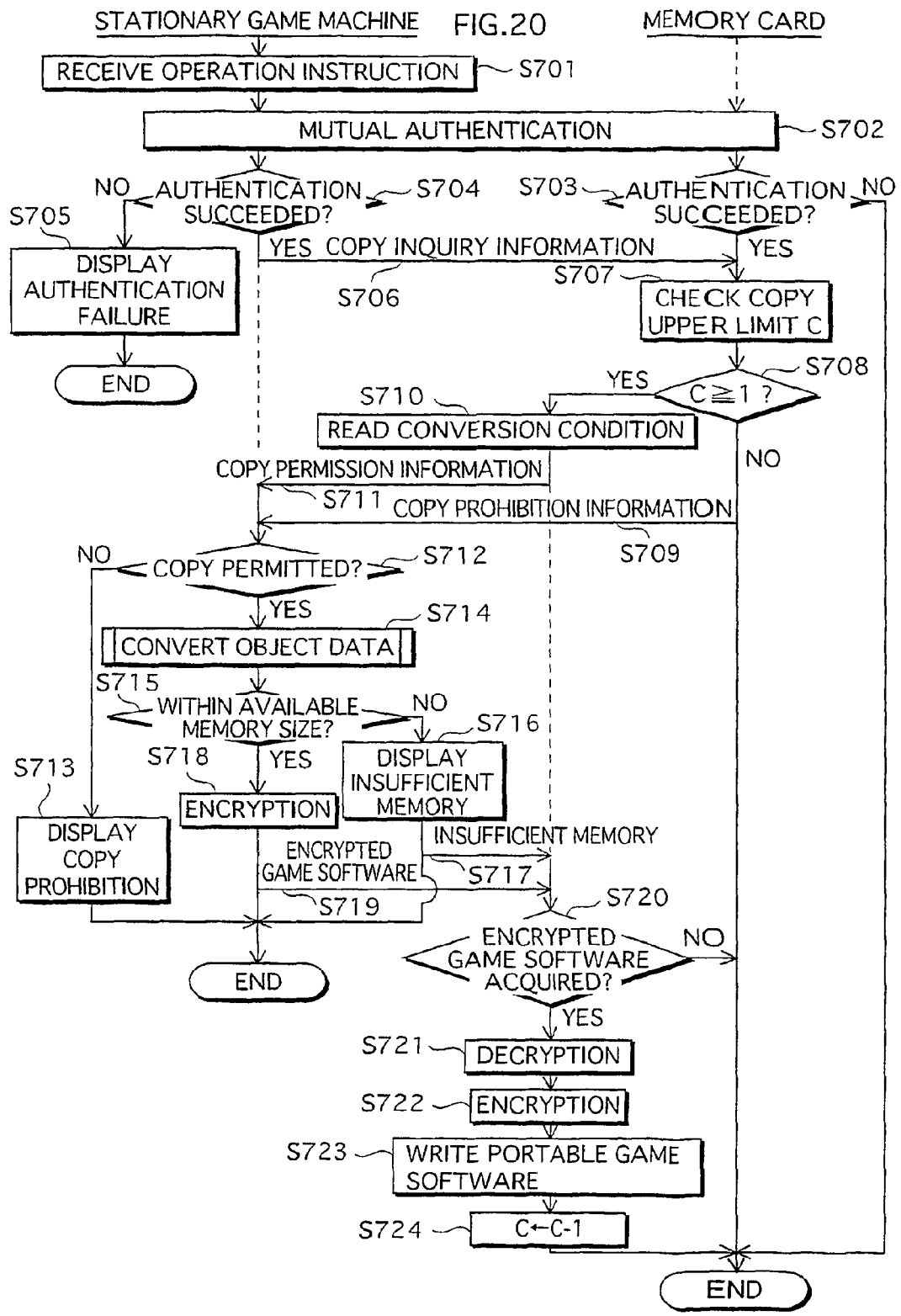
FIG. 20 is a flowchart of an operation of copying game software.

An operation of copying stationary game software from the DVD 500 to the memory card 300 is explained below, by referring to FIG. 20.

The memory card 300 downloads and stores the copy application in advance. The memory card 300 is inserted in the portable game machine 200, and the control unit 302 in the memory card 300 acquires the pixel size of the portable game machine 200 and stores it.

The memory card 300 is then removed from the portable game machine 200 and inserted in the stationary game machine 100. When the stationary game machine 100 receives an operation instruction to copy stationary game software from the user (S701), the stationary game machine 100 and the memory card 300 perform mutual authentication (S702).

If the memory card 300 has failed to authenticate the stationary game machine 100 (S703: NO), the memory card 300 ends the operation. If the memory card 300 has succeeded in authenticating the stationary game machine 100 (S703: YES), the memory card 300 continues the operation.

If the stationary game machine 100 has failed to authenticate the memory card 300 (S704: NO), the stationary game machine 100 displays a message indicating the authentication failure on the monitor 120 (S705), and ends the operation. If the stationary game machine 100 has succeeded in authenticating the memory card 300 (S704: YES), the stationary game machine 100 outputs copy inquiry information to the memory card 300 (S706).

Upon receiving the copy inquiry information, the memory card 300 reads the copy upper limit 322 from the secure area 320 (S707), and judges whether the copy upper limit 322 is no less than 1 (S708).

If the copy upper limit 322 is less than 1 (S708: NO), the memory card 300 outputs copy prohibition information (S709), and ends the operation.

If the copy upper limit 322 is no less than 1 (S708: YES), the memory card 300 reads the conversion condition (S710), and outputs copy permission information together with the conversion condition (S711).

When receiving the copy prohibition information (S712: NO), the stationary game machine 100 displays a message indicating copy prohibition on the monitor 120 (S713), and ends the operation.

When receiving the copy permission information (S712: YES), the stationary game machine 100 reads the object data unit 541 from the DVD 500, and converts the object data in the object data unit 541 from three-dimensional surface data to polygon data.

Next, the stationary game machine 100 judges whether a size of portable game software that is made up of the portable game program 562 including the converted object data and the portable character processing program 581 is no greater than the available memory size 311 included in the conversion condition (S715). If the size of the portable game software is greater than the available memory size 311 (S715: NO), the stationary game machine 100 displays a message indicating insufficient memory on the monitor 120 (S716). The stationary game machine 100 also outputs information indicating insufficient memory to the memory card 300 (S717), and ends the operation.

If the size of the portable game software is no greater than the available memory size (S715: YES), on the other hand, the stationary game machine 100 encrypts the portable game software using the public key in the public key certificate 341 included in the conversion condition (S718). The stationary game machine 100 outputs the encrypted portable game software to the memory card 300 (S719).

When receiving the information indicating insufficient memory (S720: NO), the memory card 300 ends the operation.

When receiving the encrypted portable game software (S720: YES), the memory card 300 decrypts the encrypted portable game software using the secret key 342 by the encryption/decryption unit 305 (S721). The memory card 300 then encrypts the decrypted portable game software using the unique key 331 (S722), and writes the encrypted portable game software to the data area 310 as the portable game software 313 (S723).

After the copy has been completed, the memory card 300 decrements the copy upper limit 322 by 1 (S724), and ends the operation.

3. Modifications

The present invention has been described by way of the above embodiment, though it should be obvious that the present invention is not limited to the above. Example modifications are given below.

(1) If the memory card 300 is exclusively used for games, a copy application and a copy upper limit may be stored on the memory card 300 beforehand.

Also, if the stationary game machine 100 has a communication function, the memory card 300 may download a copy application through the use of the communication function of the stationary game machine 100.

Also, an additional copy upper limit maybe acquired later. In this case, the memory card 300 downloads the additional copy upper limit from the server device 600 using the communication function of the mobile telephone 700, in the same manner as downloading a copy application. The memory card 300 then adds the additional copy upper limit to the existing copy upper limit 322 stored in the secure area 320, and sets the sum as a new copy upper limit 322.

Also, when downloading a copy upper limit from the server device 600, the user may be charged depending on the copy upper limit.

(2) If the portable game machine 200 has a communication function, a modification shown in FIG. 21 is possible.

Here, game software can be unrestrictedly copied from the DVD 500 to the memory card 300.

When the memory card 300 is inserted in the portable game machine 200 and the portable game machine 200 receives an operation instruction to use the game software stored on the memory card 300 via the input unit 201 (S751), the portable game machine 200 performs mutual authentication with the server device 600 (S752).

If the server device 600 has failed to authenticate the portable game machine 200 (S756: NO), the server device 600 ends the operation. If the server device 600 has succeeded in authenticating the portable game machine 200 (S756: YES), the server device 600 continues the operation.

If the portable game machine 200 has failed to authenticate the server device 600 (S753: NO), the portable game machine 200 displays a message indicating the authentication failure on the LCD unit 220 (S754), and ends the operation.

If the portable game machine 200 has succeeded in authenticating the server device 600 (S753: YES), the portable game machine 200 requests access permission information for accessing the secure area 320 in the memory card 300 (S755).

Upon reception of the request, the server device 600 reads the access permission information (S757), and sends it to the portable game machine 200 (S758).

After receiving the access permission information (S759), the portable game machine 200 reads the game software from the memory card 300 and executes the game software (S760).

Here, the access permission information may be information for granting access to the secure area 320, or a decryption key for decrypting encrypted data stored in the secure area 320.

(3) The above embodiment describes the case where game software is encrypted according to a public key cipher and written on the memory card 300, but this can be modified as follows.

The stationary game machine 100 holds device key DK1 which is unique to the stationary game machine 100, and the portable game machine 200 holds device key DK2 which is unique to the portable game machine 200.

The memory card 300 holds media key Km which is unique to the memory card 300. The memory card 300 also holds a key set that is made up of encrypted media keys Km1 and Km2 obtained by encrypting media key Km using each of device keys DK1 and DK2. In other words, the key set is a set of encrypted media keys obtained by encrypting media key Km such that each encrypted media key can be decrypted using a device key of a valid device.

To copy the game software to the memory card 300, the stationary game machine 100 acquires the key set from the memory card 300. The stationary game machine 100 selects encrypted media key Km1 corresponding to the stationary game machine 100 from the key set, and decrypts encrypted media key Km1 using device key DK1 to obtain media key Km.

The stationary game machine 100 and the memory card 300 perform mutual authentication and establish shared key K.

If the memory card 300 has failed to authenticate the stationary game machine 100, the memory card 300 ends the operation. If the memory card 300 has succeeded in authenticating the stationary game machine 100, the memory card 300 continues the operation.

If the stationary game machine 100 has failed to authenticate the memory card 300, the stationary game machine 100 ends the operation. If the stationary game machine 100 has succeeded in authenticating the memory card 300, the stationary game machine 100 encrypts key Kt which is used for encrypting the game software, using shared key K. The stationary game machine 100 then outputs encrypted key Kt to the memory card 300. The stationary game machine 100 also encrypts the game software using key Kt, and outputs the encrypted game software to the memory card 300.

The memory card 300 receives encrypted key Kt and the encrypted game software, and decrypts encrypted key Kt using shared key K. The memory card 300 stores key Kt and the encrypted game software, and ends the operation.

To use such game software stored on the memory card 300, the portable game machine 200 acquires the key set from the memory card 300, and selects encrypted media key Km2 corresponding to the portable game machine 200 from the key set. The portable game machine 200 decrypts encrypted media key Km2 using device key DK2 to obtain media key Km.

The portable game machine 200 and the memory card 300 perform mutual authentication and establish shared key K.

If the portable game machine 200 has failed to authenticate the memory card 300, the portable game machine 200 ends the operation. If the portable game machine 200 has succeeded in authenticating the memory card 300, the portable game machine 200 continues the operation.

If the memory card 300 has failed to authenticate the portable game machine 200, the memory card 300 ends the operation. If the memory card 300 has succeeded in authenticating the portable game machine 200, the memory card 300 encrypts key Kt using shared key K, and outputs encrypted key Kt and the encrypted game software to the portable game machine 200.

The portable game machine 200 receives encrypted key Kt and the encrypted game software, and decrypts encrypted key Kt using shared key K to obtain key Kt. The portable game machine 200 then decrypts the encrypted game software using key Kt.

In this way, the portable game machine 200 can obtain the game software and use the game software.

Here, the mutual authentication may be performed in the following way. In this example, the stationary game machine 100 or the portable game machine 200 that performs the mutual authentication with the memory card 300 is simply referred to as a game machine.

The game machine generates random numbers A1 and K1, and concatenates A1 and K1 to generate A1∥K1. Here, ∥ denotes concatenation. The game machine encrypts A1∥K1 using media key Km, and outputs encrypted A1∥K1 to the memory card 300.

The memory card 300 receives encrypted A1∥K1, and decrypts encrypted A1∥K1 using media key Km to obtain A1∥K1 The memory card 300 extracts A1 from A1∥K1, and outputs A1 to the game machine.

The game machine receives A1, and judges whether received A1 matches generated A1. If they do not match, the game machine ends the operation. If they match, the game machine continues the operation.

The memory card 300 generates random numbers A2 and K2, and concatenates A2 and K2 to generate A2∥K2. The memory card 300 encrypts A2∥K2 using media key Km, and outputs encrypted A2∥K2 to the game machine.

The game machine receives encrypted A2∥K2, and decrypts encrypted A2∥K2 using media key Km to obtain A2∥K2. The game machine extracts A2 from A2∥K2, and outputs A2 to the memory card 300.

The memory card 300 receives A2, and judges whether received A2 matches generated A2. If they do not match, the memory card 300 ends the operation. If they match, the memory card 300 calculates shared key K from generated K2 and received K1.

The game machine calculates shared key K from generated K1 and received K2.

Thus, the memory card 300 and the game machine can authenticate each other and establish shared key K.

Here, media key Km may not be stored on the memory card 300 beforehand. For instance, the memory card 300 may hold device key DK3 which is unique to the memory card 300, and select an encrypted media key corresponding to the memory card 300 from the key set to obtain media key Km.

The above example describes the case where key Kt is encrypted and decrypted using shared key K, but key Kt may be double-encrypted using media key Km and shared key K.

Also, when performing the mutual authentication and the key sharing, the stationary game machine 100 may use, instead of media key Km, a value calculated by inputting a card ID of the memory card 300 and media key Km into a function. Further, when encrypting the game software, the stationary game machine 100 may encrypt key Kt using this calculated value, further encrypt encrypted key Kt using shared key K, and output double-encrypted key Kt to the memory card 300. In this case, the portable game machine 200 calculates the value by inputting the card ID of the memory card 300 and media key Km into the function in the same way as the stationary game machine 100, and uses the calculated value for decrypting double-encrypted key Kt.

Also, shared key K may be generated by XORing K1 and K2, or by concatenating K1 and K2 as K1∥K2. Alternatively, shared key K may be calculated by inputting K1 or K2 into a one-way function.

When using a public-key cipher too, double encryption may be performed such as by encrypting a key used for encrypting game software, using a public key.

Also, the memory card 300 and each of the stationary game machine 100 and the portable game machine 200 may perform mutual authentication and key sharing using their public keys, and then encrypt game software using a shared key according to a secret key cipher such as DES and transfer the encrypted game software.

(4) The above embodiment describes the case where a portable game program and a portable character processing program are stored on the DVD 500, but they may not be stored on the DVD 500. If the DVD 500 stores only a stationary game program and a stationary character processing program corresponding to object data in the form of three-dimensional surface data, the memory card 300 acquires only the object data which is converted in the form of polygon data from the stationary game machine 100, and acquires the portable game program and the portable character processing program from the server device 600.

Also, if the memory card 300 is designed for use in portable game machines, the portable game program and the portable character processing program may be stored on the memory card 300 beforehand.

(5) The above embodiment describes the case where the stationary game machine 100 stores the conversion table, but the conversion table may be stored on the DVD 500. Games stored on a DVD differ in the amount of image data, the fineness of images, and the like. This being so, the DVD 500 can store a conversion table corresponding to each game, in which lower-limit cumulative curvature $R_L$ and upper-limit polygon side length $N_{max}$ are set in accordance with the parameters such as the pixel size and processing power of the portable game machine 200 which is expected to use the game and the available memory size of the memory card 300.

Also, object data converted from three-dimensional surface data to polygon data maybe stored on the DVD 500 beforehand. In such a case, the conversion of the object data is conducted at the time of producing the game, and both the three-dimensional surface data and the polygon data are stored on the DVD 500.

(6) The above embodiment describes the case where stationary game software is stored on the DVD 500, but the stationary game software may equally be stored on a hard disk, a CD-ROM, a BD (Blu-ray Disc), or the like.

Also, other portable storage media may be used instead of the memory card 300, so long as they can be inserted in both the stationary game machine 100 and the portable game machine 200 and have a secure area.

Also, the portable game machine 200 may be a mobile telephone.

(7) The above embodiment describes the case where if the available memory size is exceeded at roughness 1 when converting object data, lower-limit cumulative curvature $R_L$ and upper-limit polygon side length $N_{max}$ of roughness 2 are used instead. However, the data-size of the object data maybe more gradually reduced by repeating conversion in more stages, until the data size becomes within the available memory size. This can be done by increasing the number of roughness levels corresponding to each pixel size in the conversion table. As an alternative, the conversion table has only roughness 1, and if the available memory size is exceeded at roughness 1, a predetermined value is added to each of lower-limit cumulative curvature $R_L$ and upper-limit polygon side length $N_{max}$ of roughness 1 to thereby set new lower-limit cumulative curvature $R_L$ and upper-limit polygon side length $N_{max}$.

(8) When copying game software to the memory card 300, the game software may be stored in the secure area 320 in plaintext form without encryption, if the secure area 320 has a sufficient storage capacity.

(9) The above embodiment describes the case where object data is converted according to the pixel size of the LCD unit 220 in the portable game machine 200, but this is not a limit for the present invention. For example, the object data may be converted based on information about the processing power of the portable game machine 200, such as a processing capability of a CPU (e.g. clock rate) or a data transfer rate of a system bus.

(10) The above embodiment describes the case where the conversion from three-dimensional surface data to polygon data is carried out using the method of determining the polygon side length according to curvature, but a conventionally-used conversion method may be used instead.

One example of such a conventionally-used conversion method is disclosed by Japanese Patent Application Publication No. 2001-331812.

(11) The above embodiment describes the case where game software is copied to the memory card 300 if the number of times the game software is permitted to be copied to the memory card 300 is no less than 1, but the present invention is not limited to this. For instance, when copying the game software or when using the copied game software, the copyability or usability may be judged based on a condition such as the number of times the game software is permitted to be copied or used, or a valid period during which the game software is permitted to be copied or used.

As a use condition, the memory card 300 may receive valid period information indicating a valid period during which the copied game software can be used. In such a case, the memory card 300 stores the valid period information together with the copy application in advance, or receives the valid period information corresponding to the game software from the stationary game machine 100 when copying the game software. In the latter case, the stationary game machine 100 reads the valid period information corresponding to the game software from the DVD 500, and outputs it to the memory card 300.

After copying the game software, the memory card 300 stores time information such as the date and time at which the game software was copied. Subsequently, when the user instructs to use the game software on the portable game machine 200, the memory card 300 judges whether the valid period has not been passed. If the valid period has not been passed, the memory card 300 permits the portable game machine 200 to use the game software. If the valid period has been passed, the memory card 300 prohibits the portable game machine 200 to use the game software.

Here, the user may be charged depending on the valid period shown by the valid period information, in the same manner as the above modification (1). Also, if the memory card 300 is exclusively used for games, the valid period information may be stored on the memory card 300 in advance.

(12) The present invention also applies to the method described above. This method may be realized by a computer program that is executed by a computer. Such a computer program may be distributed as a digital signal.

The present invention may be realized by a computer-readable storage medium, such as a flexible disk, a hard disk, a CD-ROM, an MO, a DVD, a DVD-ROM, a DVD-RAM, a BD, or a semiconductor memory, on which the above computer program or digital signal is recorded. Conversely, the present invention may also be realized by the computer program or digital signal that is recorded on such a storage medium.

The computer program or digital signal that achieves the present invention may also be transmitted via a network, such as an electronic communication network, a wired or wireless communication network, or the Internet.

The present invention can also be realized by a computer system that includes a microprocessor and a memory. In this case, the computer program can be stored in the memory, with the microprocessor operating in accordance with this computer program.

The computer program or digital signal may be provided to an independent computer system by distributing a computer-readable storage medium on which the computer program or digital signal is recorded, or by transmitting the computer program or digital signal via a network. The independent computer system may then execute the computer program or digital signal to function as the present invention.

(13) The above embodiment and modifications may be freely combined.

INDUSTRIAL APPLICABILITY

The present invention can be used recurrently and continuously in an industry that provides computer game software to users and in an industry that manufactures and sells stationary game machines, portable game machines, and computer systems capable of executing computer game software.

The invention claimed is:

1. A game system comprising:
a first game execution apparatus and a second game execution apparatus which each executes a game in accordance with a game program, the first game execution apparatus having a higher processing power than the second game execution apparatus; and
a portable storage medium,
wherein the portable storage medium:
stores information written by the second game execution apparatus and indicating the processing power of the second game execution apparatus;
holds management information for managing use of game software that includes the game program, acquires the game software from the first game execution apparatus and stores the game software;
judges whether the game software is permitted to be used in the second game execution apparatus according to the management information, when the game software is requested by the second game execution apparatus; and
outputs the game software to the second game execution apparatus, when the portable storage medium judges that the game software is permitted to be used in the second game execution apparatus,
wherein the first game execution apparatus:
reads the game program and first image data suited for use in the first game execution apparatus from a storage medium having a larger capacity than the portable storage medium;
reads the information indicating the processing power of the second game execution apparatus from the portable storage medium;
converts the first image data to second image data suited for use in the second game execution apparatus based on the information indicating the processing power of the second game execution apparatus; and
outputs the game software that includes the game program and the second image data to the portable storage medium, and
wherein the second game execution apparatus:
does not include a mechanism for reading data from the storage medium having the larger capacity than the portable storage medium;
requests the game software from the portable storage medium; and
when acquiring the game software from the portable storage medium, executes a game in accordance with the game program, generates an image from the second image data and displays the generated image in accordance with a progression of the game.

2. The game system of claim 1, wherein, when the game software is permitted to be copied to the portable storage medium, the portable storage medium acquires and stores the game software.

3. A portable storage medium that is removeably connectable to a first game execution apparatus and a second game execution apparatus which each executes a game in accordance with a game program, the first game execution apparatus having a higher processing power than the second game execution apparatus, the portable storage medium comprising:
a physical memory;
a storage unit storing, via the physical memory, information written by the second game execution apparatus and indicating the processing power of the second game execution apparatus and outputting, to the first game execution apparatus, the information indicating the processing power of the second game execution apparatus;
a holding unit holding management information for managing use of game software that includes the game program and second image data having been converted from first image data by the first game execution apparatus based on the information indicating the processing power of the second game execution apparatus, the game program and the first image data being read by the first game execution apparatus from a storage medium having a larger capacity than the portable storage medium, the first image data being suited for use in the first game execution apparatus, and the second image data being suited for use in the second game execution apparatus;
an acquisition unit acquiring, from the first game execution apparatus, the game software that includes the game program and the second image data converted from the first image data by the first game execution apparatus, and storing the acquired game software in the storage unit;
a judgment unit judging whether the game software is permitted to be used in the second game execution apparatus according to the management information, when the game software is requested by the second game execution apparatus; and
an output unit outputting the game software to the second game execution apparatus, when the judgment unit judges that the game software is permitted to be used in the second game execution apparatus which does not include a mechanism for reading data from the storage medium having the larger capacity than the portable storage medium.

4. The portable storage medium of claim 3, wherein the acquisition unit acquires the management information corresponding to the game software, from the first game execution apparatus.

5. The portable storage medium of claim 3,
wherein the holding unit holds, as the management information, valid period information indicating a valid period during which the game software is permitted to be used, and
wherein the judgment unit judges whether the game software is permitted to be used according to the valid period information.

6. The portable storage medium of claim 5,
wherein the acquisition unit acquires additional valid period information indicating an additional valid period during which the game software is permitted to be used, and
wherein the holding unit updates the valid period information, by adding the additional valid period indicated by the additional valid period information to the valid period indicated by the valid period information.

7. The portable storage medium of claim 3, wherein the holding unit holds the management information in an area that is inaccessible from outside the portable storage medium.

8. The portable storage medium of claim 3,
wherein the holding unit further holds copy information indicating whether the game software is permitted to be copied to the portable storage medium,
wherein the judgment unit further judges whether the game software is permitted to be copied to the portable storage medium, based on the copy information, and
wherein the acquisition unit acquires the game software, when the judgment unit judges that the game software is permitted to be copied to the portable storage medium.

9. The portable storage medium of claim 8,
wherein the copy information indicates a number of times the game software is permitted to be copied to the portable storage medium,
wherein the judgment unit judges whether the number indicated by the copy information is no less than 1, and
wherein, when the judgment unit judges that the number is no less than 1, the acquisition unit acquires the game software and then decrements the number by 1.

10. The portable storage medium of claim 9,
wherein the acquisition unit acquires the copy information from an external management device, and
wherein the holding unit holds the acquired copy information.

11. The portable storage medium of claim 9,
wherein the acquisition unit acquires additional copy information indicating an additional number of times the game software is permitted to be copied to the portable storage medium, from an external management device, and
wherein the holding unit updates the copy information by adding the additional number indicated by the additional copy information to the number indicated by the copy information.

12. The portable storage medium of claim 9,
wherein the acquisition unit further acquires a copy program which describes a procedure of copying the game software to the portable storage medium, from an external management device,
wherein the judgment unit judges whether the number indicated by the copy information is no less than 1, and
wherein, when the judgment unit judges that the number is no less than 1, the acquisition unit acquires the game software and then decrements the number by 1.

13. The game system of claim 1, wherein the information indicating the processing power of the second game execution apparatus indicates a display capacity.

* * * * *